United States Patent [19]
Irvine-Halliday et al.

[11] Patent Number: 4,998,247
[45] Date of Patent: Mar. 5, 1991

[54] ACTIVE STAR-CONFIGURED LOCAL AREA NETWORK

[76] Inventors: David Irvine-Halliday, 19 Hawkley Valley Place, N.W., Calgary, Canada, T3G 3C7; Abraham O. Fapojuwo, 817 Harris Place N.W., Calgary, Alberta, Canada, T3B 2V4; Wah-Chun Chan, 6235 Dalmarnock Green, N.W., Calgary, Alberta, Canada, T3A 1H4

[21] Appl. No.: 204,837

[22] Filed: Jun. 10, 1988

[51] Int. Cl.$^5$ .............................. H04J 3/24; H04J 3/02
[52] U.S. Cl. .................................. 370/94.1; 370/85.6; 340/825.5
[58] Field of Search ..................... 370/60, 85, 94, 60.1, 370/85.2, 85.6, 94.1, 94.3; 340/825.5, 825.51

[56] References Cited
U.S. PATENT DOCUMENTS

| | | | |
|---|---|---|---|
| 4,186,380 | 1/1980 | Edwin et al. | 371/11 |
| 4,276,656 | 6/1981 | Petryk, Jr. | 455/608 |
| 4,334,306 | 6/1982 | Ulug | 370/94 |
| 4,402,090 | 8/1983 | Gfeller et al. | 455/601 |
| 4,430,699 | 2/1984 | Segarra et al. | 350/96.16 |
| 4,471,481 | 9/1984 | Shaw et al. | 370/85 |
| 4,494,185 | 1/1985 | Gunderson et al. | 364/200 |
| 4,503,533 | 3/1985 | Tobagi et al. | 370/85 |
| 4,507,777 | 3/1985 | Tucker et al. | 370/16 |
| 4,516,239 | 5/1985 | Maxemchuk | 370/85 |
| 4,530,088 | 7/1985 | Hamstra et al. | 370/110.1 |
| 4,568,930 | 2/1986 | Livingston et al. | 370/85 |
| 4,570,162 | 2/1986 | Boulton et al. | 340/825.5 |
| 4,608,559 | 8/1986 | Friedman et al. | 370/85 |
| 4,631,718 | 12/1986 | Miyao | 370/85 |
| 4,651,316 | 3/1987 | Kocan et al. | 370/85 |
| 4,653,047 | 3/1987 | Vij et al. | 370/85 |
| 4,654,889 | 3/1987 | Shutterly | 455/601 |
| 4,682,326 | 7/1987 | Ulug | 370/89 |
| 4,688,213 | 8/1987 | Raychaudhuri | 370/93 |
| 4,692,919 | 9/1987 | West, Jr. | 370/96 |
| 4,701,909 | 10/1987 | Kavehrad et al. | 370/85 |
| 4,701,910 | 10/1987 | Ulug | 370/85 |
| 4,704,713 | 11/1987 | Haller et al. | 370/3 |
| 4,705,350 | 11/1987 | Cheng | 350/96 |
| 4,712,589 | 12/1987 | De Gaspari | 433/167 |
| 4,717,914 | 1/1988 | Scott | 340/825.06 |
| 4,725,834 | 2/1988 | Chang et al. | 370/85 |
| 4,731,880 | 3/1988 | Ault et al. | 370/94 |
| 4,737,783 | 4/1988 | Tanaka et al. | 340/825.5 |
| 4,742,349 | 5/1988 | Miesterfeld et al. | 370/85 |
| 4,751,510 | 6/1988 | de Saint Michel et al. | 37/84 |
| 4,755,817 | 7/1988 | Vandenbulcke et al. | 340/825.57 |
| 4,755,971 | 7/1988 | Jasmer et al. | 370/102 |
| 4,771,286 | 9/1988 | Niessen et al. | 370/85 |

OTHER PUBLICATIONS

E. S. Lee, "The One-Network Campus," SuperNetwork Super 100 Technology Review.
D. D. Cowan et al, "Diversity, Accessibility and Adaptability, Data Communication Needs for Higher Education, The University of Waterloo Experience," pp. 48.5.1–48.5.5.
"Systems 100 Mb/s Fiber Optic LAN", DS-035-86-00.
"Delay Bounds in Local Area Networks", by P. I. P. Boulton and E. S. Lee.

*Primary Examiner*—Douglas W. Olms
*Assistant Examiner*—Wellington Chin
*Attorney, Agent, or Firm*—Burns, Doane, Swecker & Mathis

[57] ABSTRACT

A data transmission network is disclosed which includes a plurality of nodes each adapted to send a packet of data. A controller, or hub, is connected to each of the plurality of nodes for immediately relaying a packet from one of the nodes to a desired destination when it is the only packet received by the controller means. However, when a plurality of packets are simultaneously received by the controller from plural nodes, the controller immediately relays a selected packet, and temporarily stores the other packets for subsequent transmission.

22 Claims, 15 Drawing Sheets

| PA | SD | FC | DA | SA | II | P OR N | U OR S OR G | 1 TO M | DATA | FCS |
|---|---|---|---|---|---|---|---|---|---|---|
| 1 | 2 | 3 | 4 | 5 | 6 | 7 | 8 | 9 | 10 | 11 |

FIG. 5

LEGEND

- ☒ = HUB x
- ⓨ = NODE y
- x = HUB IDENTITY NUMBER
- y = NODE IDENTITY NUMBER
- U = UNIVERSAL BROADCAST
- S = SELECTIVE BROADCAST
- G = LOCAL GLOBAL BROADCAST
- II = PRIORITY LEVEL TWO
- N = NONPRE-EMPTIVE PRIORITY
- n = NUMBER OF NODES ON A HUB
- M = NUMBER OF HUBS IN THE NETWORK
- PA = IDLE PREAMBLE
- SD = START DELIMITER
- FC = FRAME CONTROL
- DA = DESTINATION ADDRESS
- SA = SOURCE ADDRESS
- FCS = FRAME CHECK SEQUENCE
- P = PRE-EMPTIVE PRIORITY

FIG. 6

A. FIFO BUFFER
1. UNIVERSAL BROADCAST 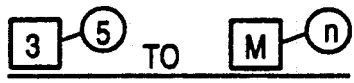
| 1 | 0 | U | 3 | 3 | 5 |    PACKET XMTD BY [3] TO [2]
| 0 | 0 | U | 1 | 3 | 5 |    PACKET XMTD BY [1] TO [M]-(n)
2. SELECTIVE BROADCAST 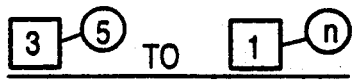
| 1 | 0 | S | 3 | 3 | 5 |    PACKET XMTD BY [3] TO [2]
| 1 | 0 | S | 1 | 3 | 5 |    PACKET XMTD BY [1] TO [1]-(n)
| 3 | 5 | S | 1 | 3 | 5 |    PACKET XMTD BY [1] TO [3]-(5)
3. SELECTIVE BROADCAST 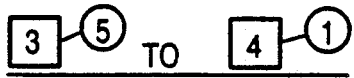
| 4 | 1 | S | 3 | 3 | 5 |    PACKET XMTD BY [3] TO [2]
| 4 | 1 | S | 4 | 3 | 5 |    PACKET XMTD BY [4] TO [4]-(1)
| 3 | 5 | S | 4 | 3 | 5 |    PACKET XMTD BY [4] TO [3]-(5)
4. LOCAL GLOBAL BROADCAST 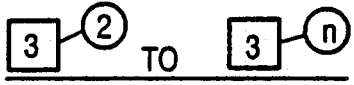
| 3 | 0 | G | 3 | 3 | 5 |    PACKET XMTD BY [5] AND [3]-(n)
5. LOCAL SELECTIVE BROADCAST 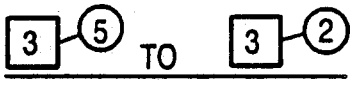
| 3 | 2 | S | 3 | 3 | 5 |    PACKET XMTD BY [5] AND [3]-(2)(5)
FIG. 7A

B. RANDOM ACCESS BUFFER

1. UNIVERSAL BROADCAST PRIORITY LEVEL II AND NONPRE-EMPTIVE

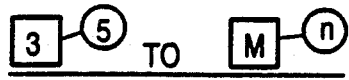

| II | N | 1 | 0 | U | 3 | 5 |   PACKET XMTD BY [3] TO [2]

| II | N | 0 | 0 | U | 1 | 3 | 5 |   PACKET XMTD BY [1] TO [M]-(n)

2. SELECTIVE BROADCAST

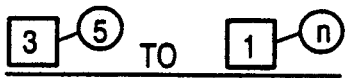

| II | N | 1 | 0 | S | 3 | 5 |   PACKET XMTD BY [3] TO [2]

| II | N | 1 | 0 | S | 1 | 3 | 5 |   PACKET XMTD BY [1] TO [1]-(n)

| II | N | 3 | 5 | S | 1 | 3 | 5 |   PACKET XMTD BY [1] TO [3]-(5)

3. SELECTIVE BROADCAST

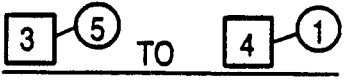

| II | N | 4 | 1 | S | 3 | 5 |   PACKET XMTD BY [3] TO [2]

| II | N | 4 | 1 | S | 4 | 3 | 5 |   PACKET XMTD BY [4] TO [4]-(1)

| II | N | 3 | 5 | S | 4 | 3 | 5 |   PACKET XMTD BY [4] TO [3]-(5)

4. LOCAL GLOBAL BROADCAST

| II | N | 3 | 0 | G | 3 | 5 |   PACKET XMTD BY [5] AND [3]-(n)

5. LOCAL SELECTIVE BROADCAST

| II | N | 3 | 2 | S | 3 | 5 |   PACKET XMTD BY [5] AND [3]-(2,5)

FIG. 7B

THROUGHPUT – INPUT TRAFFIC CHARACTERISTICS, M = 4 NODES

THROUGHPUT – INPUT TRAFFIC CHARACTERISTICS,
M = 4 AND M = 10,
L = 2500 BYTES

MEAN PACKET DELAY - INPUT TRAFFIC CHARACTERISTICS
M = 4 NODES

MEAN PACKET DELAY - INPUT TRAFFIC CHARACTERISTICS
M = 10 NODES

MEAN PACKET DELAY - INPUT TRAFFIC CHARACTERISTICS
M = 4, M = 10 AND L = 2500 BYTES

COMPARISON BETWEEN THE MEAN WAITING TIME OBTAINED USING TWO APPROACHES. (APPROACH 1: EQUATION (17) USING EQUATIONS (16), (18) AND (19): APPROACH 2: EQUATION (17) USING EQUATIONS (22) TO (24). FOR BOTH CASES M = 10).

THROUGHPUT - DELAY CHARACTERISTICS COMPARISON BETWEEN THE CSMA-CD, HUBNET AND THE PRESENT INVENTION PROTOCOLS. (M = 10, L = 2500 BYTES, B = 10 Mb/s).

ACTIVE STAR-CONFIGURED LOCAL AREA NETWORK

BACKGROUND OF THE INVENTION

The present invention generally relates to a data transmission system. More specifically, the present invention relates to a method and apparatus for efficiently controlling the exchange of data packets within an active star-configured local area network.

In local area networks, there are increasing needs for the transmission of multiple information such as voice and video images along with data traffic. To cope effectively with the associated need of integrating information, large capacity (high speed) is required. This requirement can be satisfied by the construction of local area networks.

Local area network applications of, for example, optical fiber systems have generated a considerable interest in recent years, this being due to the unique characteristics of the optical fiber such as wide bandwidth, low loss, electromagnetic immunity and the potential for supporting new services on installed fibers for future expansions. One of the popular topologies in fiber-optic local area networks (FOLAN's) is the star topology which can be either passive or active in design.

An active star-configured FOLAN has the following features: (1) all the network nodes (e.g., access controllers) are interconnected via a controller, or hub, with each node being connected to the hub by two optical fiber-links—one for transmitting to the hub and the other for receiving from the hub; (2) interconnection is point-to-point, which of course makes it suitable for fiber-optic based implementation; (3) data loss due to numerous connectors (prevalent in bus-configured FOLAN's) can be avoided, thus a reasonably large number of nodes can be supported; (4) simple cost-effective optical-electronic devices such as light emitting diodes (LED's) and PIN diodes can be used at the network nodes thus implying less circuit design complexity and lower cost and (5) the hub contains some intelligence which means the network access protocol becomes simplified.

The star-configured FOLAN is analogous to a system consisting of a single resource which is shared by a number of independent users and the main problem is how to effectively share the hub (i.e., the resource) among the nodes in the star network. To achieve effective hub sharing, the network nodes and the hub must adopt a set of rules known as protocols for governing data transmission.

The first study of protocols for active star-configured FOLAN's was made by Schmidt et al. and was called "Fibernet II". "Fibernet II" is based on the carrier sense multiple access with collision detection (CSMA-CD) protocol. Collisions occur when two nodes attempt to transmit data signals to a shared central controller simultaneously. In such an event, all of the data being transmitted becomes garbled (i.e., undecipherable) and must be re-transmitted after randomly selected delays. A well-known problem inherent in the CSMA-CD is the network instability under heavy traffic due to a large number of collisions. Hence, the "Fibernet II" is not very efficient.

The second protocol developed for active star-configured FOLAN's assumes the controller is intelligent so that collisions are avoided. One such example of an active star-configured FOLAN which includes such an intelligent controller is disclosed in U.S. Pat. No. 4,570,162 to Boulton et al. In this patent, a data transmission network is disclosed which includes a number of access controllers (i.e., nodes) connected to a central hub. Each access controller is connected to a hub by both a transmission link and a reception link. The hub includes a selection means connected to the hub end of each access controller transmission link. The hub also includes a broadcast means connected to the reception link of each access controller.

In accordance with the operation disclosed in the Boulton et al. patent, the selection side of the hub receives a single packet of data from a selected access controller, and passes it through a link to the broadcast means. The broadcast means then transmits that particular packet to all of the access controllers connected to the hub. Each access controller monitors the packets which it receives from the hub in order to retain packets intended for it, and in order to determine whether the packet it previously transmitted was the packet selected by the hub for transmission. If the access controller determines that its packet was not the one selected for transmission by the hub, it will again try to have the hub broadcast its packet by re-transmitting the packet to the hub.

Because the data packet of only a single access controller is selected for transmission, a data transmission network as discussed with respect to the aforementioned patent avoids the potential occurrence of destructive collision. Although such a system thus provides a collision-avoidance protocol which yields an improved network performance over the "Fibernet II", it is still possible to have unbounded packet delays, especially under heavy traffic. An unbounded packet delay occurs when there is large, potentially unlimited delay in the transmission of a particular packet of data from one location in a network to another location in the network. These large delays can occur for two reasons: (1) when two or more network access controllers simultaneously contend for transmission during a free state of the hub, only one of the contending network access controllers is allowed to successfully transmit and the other contending network access controllers must retry after a timeout interval; thus, it is possible for a network access controller to be involved in a contention at every try/retry and as it may continually not be the one selected to successfully transmit, an unbounded delay for its packet will result; (2) when a network access controller attempts to transmit during a busy state of the hub (i.e., when the hub is already in the process of transmitting other data packets), the network access controller will back off and retry at a later time; thus, a network access controller may always attempt to transmit/retransmit at a time when the hub is busy such that an unbounded delay for the network access controller's packet could again result.

Thus, a need exists in the prior art for a more efficient active star-configured local area network.

SUMMARY OF THE INVENTION

Accordingly, it is an object of the present invention to provide a new collision-avoidance multiple access protocol which will overcome the unbounded delay of the previously developed collision-avoidance protocol. Such a protocol is realized by the following network system operation:

(1) when the hub is in the free state and two or more nodes simultaneously forward their packets to the hub (i.e., more than one node contends for service by the hub), the hub will begin to store the packets in a buffer, and then use a prescribed ordering sequence to transmit one packet from each of the contending nodes, this being realizable because the controller is intelligent;

(2) when the hub is in a busy state and a node forwards its packet to the hub, the packet is simply stored in the hub buffer to await transmission on, for example, a first-come first-serve basis.

Thus, in accordance with the present invention, a data transmission network is disclosed which includes a plurality of nodes each adapted to send a packet of data. A controller means, or hub, is connected to each of the plurality of nodes for immediately relaying a packet from one of the nodes to a desired destination when it is the only packet received by the controller means. However, when a plurality of packets are simultaneously received by the controller means from plural nodes, the controller means immediately relays a selected packet, and temporarily stores the other packets for subsequent transmission.

In accordance with a further embodiment of the present invention, the controller means includes a buffer for temporarily storing the data packets, and operates in three basic states:

(a) a first state in which the buffer does not contain any previously-stored packets and in which only one packet is received by the controller means such that the controller means will virtually immediately relay the packet toward its respective destination;

(b) a second state in which the buffer does not contain any previously-stored packets and in which a plurality of packets are received at substantially the same time from more than one node, such that the controller means will virtually immediately relay a selected one of the packets towards its respective destination and will temporarily store the other packets in the buffer to be retrieved and relayed in a prescribed, ordered sequence after the selected packet has been relayed; and (c) a third state in which the buffer does contain at least one previously-stored packet and in which a plurality of packets are received at substantially the same time from more than one node, such that the controller means will temporarily store at least some of the incoming packets in the buffer along with the at least one previously-stored packet and relay the packets in a predetermined order at a time after the controller means has completed its current transmission.

The selected packet may be chosen on a first-in first-out basis or, in the case where a random access buffer is used, on the basis of some predetermined level of priority. In addition, a packet may be broadcast universally, or may be selectively broadcast to only a single node or group of nodes.

Other features and advantages of the present invention include, but are not limited to:

a data transmission network which is truly collision-free, and in which a node never has to re-transmit a packet to a hub, such that additional propagation delays due to re-transmissions can be completely avoided and data throughput can be increased;

a data transmission network which exhibits a reasonable degree of service fairness among contending nodes;

a collision-free data transmission network which has a bounded access delay time regardless of how busy the network becomes, such that data packets (e.g. voice packets) may be transmitted with a high confidence level;

a data transmission network which combines the features of multiple buffers in a hub and true physical full-duplex operation, so as to permit a node to have a packet in transit to its own hub or elsewhere in the network at the same time it is receiving an entirely different packet from another node;

a data transmission network which does not depend strongly on the network propagation delay such that there is no restriction on packet size;

a data transmission network having a selective broadcast capability such that a node may transmit a packet directly to one other node or to all the nodes accessing a specific hub without any of the remaining network nodes being aware of the transmission;

a data transmission network having a local selective broadcast capability whereby a node may send a packet to another node hub such that the packet is only transmitted within that particular hub, thus lowering packet transmission delay and increasing overall network efficiency;

a data transmission network in which there is a greater degree of overall network fairness in allocating bandwidth since packets addressed to local or close-by destinations do not have to climb to the top of a network tree, competing at every hub for service;

a data transmission network in which a priority packet service scheme can be utilized such that the highest priority packet will immediately go to the head of the queue at every hub it visits; and in which if there are numerous high priority packets, the hub will ensure that the lower level packets receive a certain minimum level of service so as to avoid unbounded delays; and a data transmission network in which a priority scheme that includes pre-emptive or nonpre-emptive status designations can be utilized.

BRIEF DESCRIPTION OF THE DRAWINGS

Other objects and advantages will become apparent from the following detailed description of a preferred embodiment of the invention as described in conjunction with the accompanying drawings wherein like reference numerals are applied to like elements and wherein:

FIG. 5 is one example of a general packet field format that could be used for either a FIFO Buffer or a Random Access Buffer;

FIG. 6 is a legend corresponding to FIGS. 4 and 5;

FIGS. 7A and 7B show various examples of packet field formats for use with a FIFO Buffer and a Random Access Buffer, respectively;

DETAILED DESCRIPTION OF THE PREFERRED EMBODIMENTS

Figure 1:
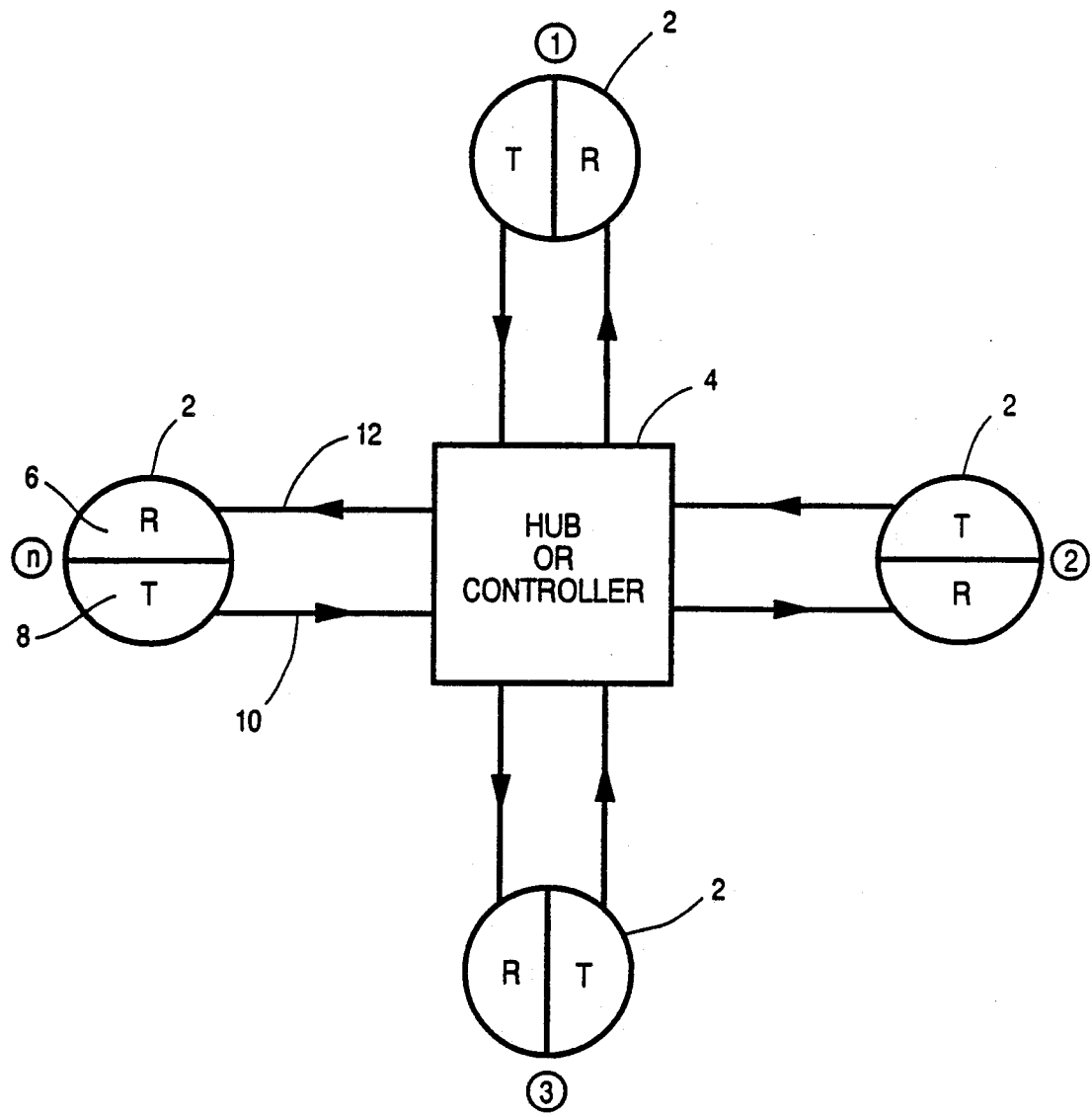
FIG. 1 is a block diagram of a typical active star-configured fiber-optic local area network.

The present invention will now be discussed as it relates to a multiple access protocol for active star-configured fiber-optic local area networks, (FOLAN's). The main features of the protocol include collision-avoidance, no packet retransmissions, a reasonable degree of fairness among the nodes contending for transmission, a bounded access delay, priority selection of packets and selective broadcasting. A typical active star-configured FOLAN consists of a finite number of nodes, each of which comprises an intelligent hub. For example, as shown in FIG. 1, the typical prior art active star-configured FOLAN includes a number of nodes 2, labelled 1−n, which are connected to a particular hub 4. Such a network and its general operation are generally known in the art, as described in the aforementioned U.S. Pat. No. 4,570,162, to Boulton et al, which is hereby incorporated by reference. Each node in the network is connected to its hub by two high speed optical fiber links, 10 and 12, which have full-duplex capability.

Figure 2:
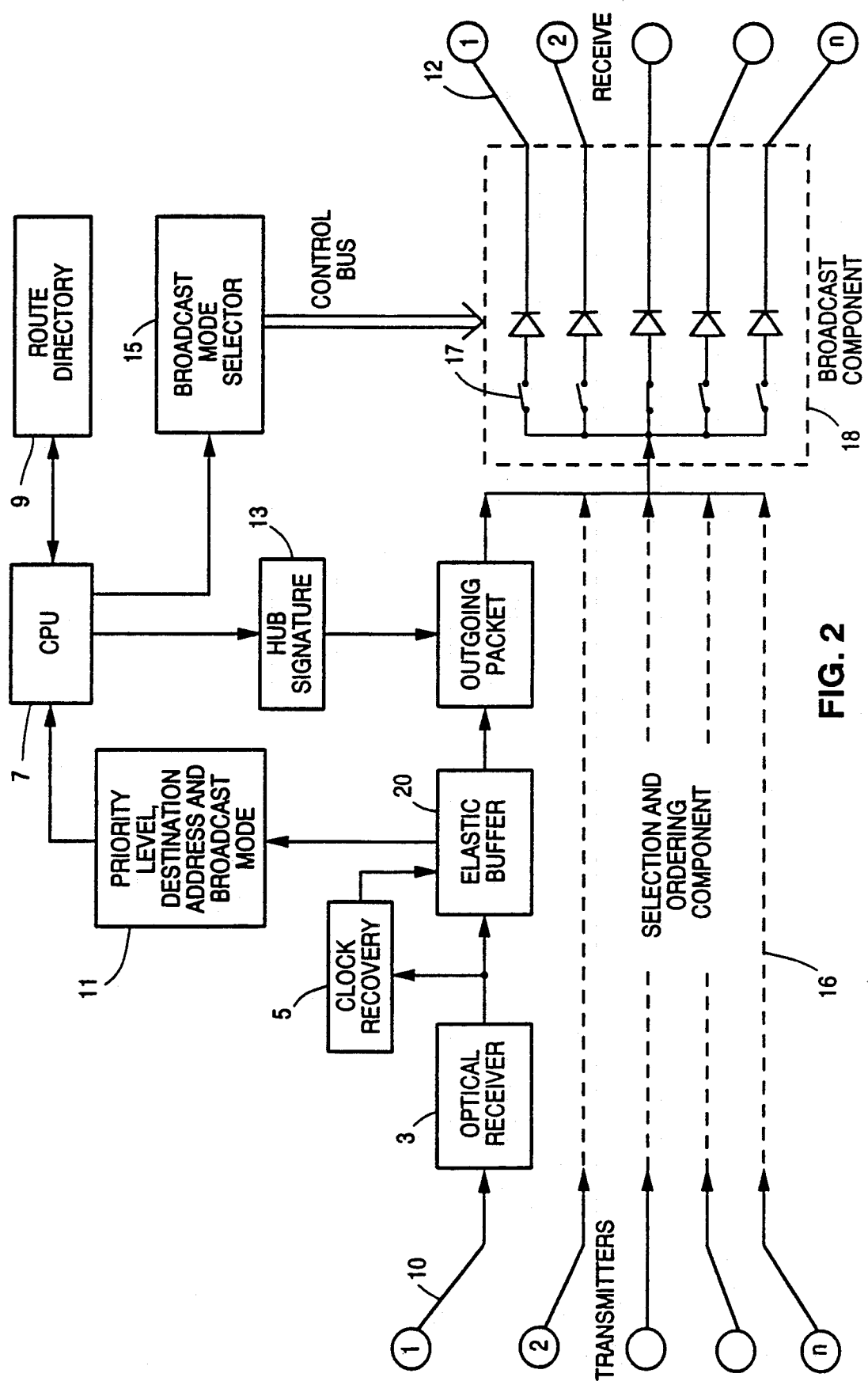
FIG. 2 is a partial schematic representation of a hub for the network of FIG. 1 in accordance with the present invention.

FIG. 2 shows a partial schematic representation of one embodiment of the inventive controller means, or hub which is used in the network of the present invention. In one preferred embodiment of the present invention a plurality of hubs are employed to form a network.

Referring to FIG. 2, the hub 14 is shown to include a selection and ordering means 16 and a broadcast means 18. In accordance with the present invention, the selection and ordering means 16 further includes a buffer means 20, whose storage capacity is equal to the number of nodes on that hub. The hub includes a clock recovery means 5 and a CPU 7 to control operation of the hub. A route directory 9 is also included, and has stored therein, information regarding the path a particular packet of data must follow through a data network in order to be properly transmitted from a particular source node to one or more destinations.

A priority level, destination address and broadcast mode element 11 provides priority information contained in data packets received by the hub from various nodes via optical receivers 3 to the CPU 7. After determining which incoming packet is to be next transmitted, the CPU will include a self identification signature in the data packet via element 13 and then issue routing instructions to the broadcast means via a broadcast mode selector 15. As can be seen in FIG. 2, the broadcast means includes a plurality of switches 17 which are used to route the data packets to their respective destinations.

The buffer means 20 included in the hub can be of a known first-in, first-out (FIFO) type or of a random access type. The buffer means 20 is used to temporarily store data information which is received substantially simultaneously over a plurality of data link inputs to the hub. The phrase "substantially simultaneously" or simply "simultaneously" is used herein to mean approximately within the time it takes to transmit one bit. Because data which is transmitted simultaneously over a plurality of data link inputs to the hub is stored, collisions of data transmissions are avoided. That is, the hub will receive and store most of the data, and then transmit it in turn. Thus, the collision-free protocol of the present invention can completely avoid the additional propaqation delays of prior art systems which were incurred by the need to re-transmit data information which had been previously rejected by the hubs located all the way up a network tree to the central controller.

More specifically, because the hub 14 shown in FIG. 2 is an intelligent controller, it can arrange the transmission of contending inputs due to simultaneous multi-arrivals at the hub, in a prescribed order. For example, data which is simultaneously transmitted to a hub from various nodes linked to the hub can be ordered in the buffer by address. Thus, a node with a higher address may be transmitted by the hub before data from a node having a lower address when two or more nodes contend for transmission simultaneously.

Figure 3:
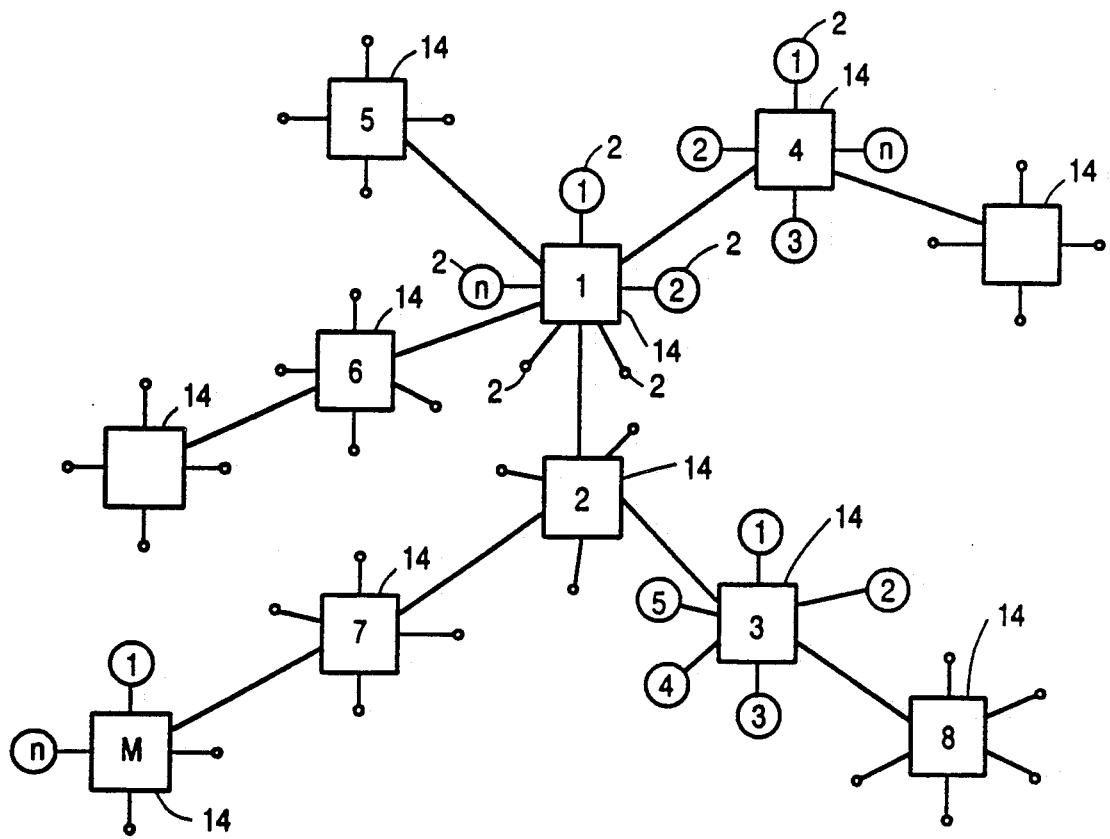
FIG. 3 is a block diagram representation of a data transmission network in accordance with the present invention.

An example of an active star-configured FOLAN which includes a plurality of hubs 14 labelled 1−M, is shown in FIG. 3. As can be seen in FIG. 3, in addition to providing data links between the hubs 14, data links are also provided between a particular hub and a plurality of local nodes associated only with that hub. For example, the hub 14 which is labelled #1 in FIG. 3 is not only linked directly to the hubs labelled #2, #4, #5 and #6, but is also linked to the local nodes 2 which are labelled 1−n.

A node can be in either an idle state or in an active (transmit/wait) state. A node is in the active-transmit state if it forwards a packet to the hub during the hub free state and in the active-wait state if it forwards a packet to the hub during the hub busy state. A node is in the idle state if it does not have a packet to forward to the hub.

Figure 4:
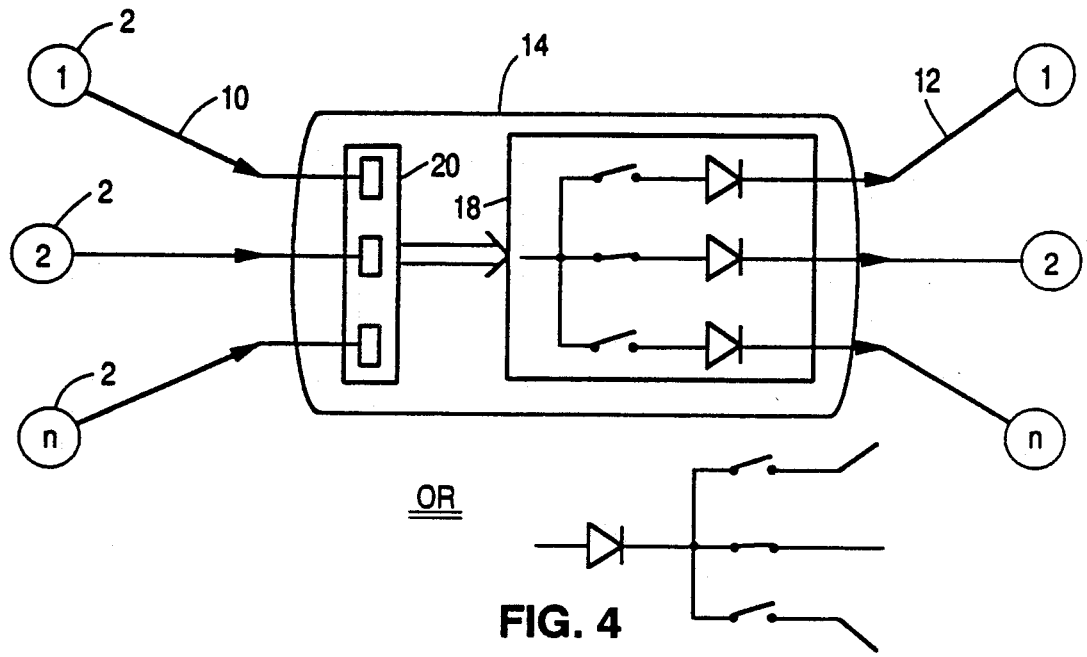
FIG. 4 is a partial schematic representation of the selective switching capability performed by a hub in accordance with the present invention.

FIG. 4 shows a partial schematic representation of the switching capabilities of each of the hubs 14 shown in FIG. 3. As exemplified by the schematic in FIG. 4, any data received by the hub 14 either locally from a node associated only with that hub or from another hub, can be directed to any or all of the output transmission links of the hub. Thus, such a configuration permits the hub to selectively control the receivers in the network which will receive a particular transmission from the hub.

The nodes transmit and receive data which has been placed into a packet field format. The overall packet format could, for example, correspond to a standardized Fibre Distributed Data Interface (FDDI) Type Field Format. Such a packet is shown in FIG. 5. In FIG. 5, each box or field in the packet corresponds to a particular portion of data which is transmitted when a transmission is initiated. Transmission of a complete packet thus requires a set number of time slots.

It should be noted that because the network of the present invention is not affected by propagation delays associated with retransmissions, there is virtually no restriction on the number of bytes contained in a packet. Thus, a network constructed in accordance with the teachings of the present invention could handle mixed traffic, consisting of short and long messages, equally well.

The first five fields in the FIG. 5 data packet, beginning from the left, correspond to standard FDDI field format information. That is, the first field "PA" corresponds to an idle preamble field. The data contained in this field alerts the receiving hub that there is an incoming packet. For example, because a hub may go into an idle state if it is inactive for a period of time, the idle preamble field contains information which will reactivate the hub and synchronize its operation with the hub or node sending the packet. Thus, the use of such a format would provide the same method of point-to-point (node-hub-node) clock synchronization as proposed for the FDDI. Accordingly, overall synchronism of the entire network is not required in a preferred embodiment of the invention, but in other embodiments it may be preferred to transmit idle signals at continuous intervals in order to retain synchronization of idle nodes at all times.

The second through the fifth fields also correspond to the standard FDDI field format. That is, "SD" corresponds to starting delimiter data; "FC" corresponds to the frame control (i.e., indicates to the hub whether the information being transmitted is, for example, data as opposed to some type of internal control message); "DA" corresponds to the destination address; and, "SA" corresponds to the source address. The tenth field in the packet corresponds to the data to be transmitted, while the final field in the packet, "FCS", corresponds to frame check sequence. The information in this field is used to indicate whether a frame of data in a packet has been received without error at the destination address.

The sixth through the ninth fields in the packet field format of FIG. 5 provide specific information used by the hub in the local area network of an embodiment of the present invention. The sixth field provides an indication to the receiving hub of the priority level of the packet. For example, bits corresponding to a particular code, represented in FIG. 5 as a Roman number II, might correspond to the highest level priority, while bits represented as, for example, a Roman numeral I might correspond to a lower level priority. A receiving hub, upon detecting that a data packet corresponds to the highest priority would let this packet proceed to the top of the buffer queue so that it could be served immediately upon completion of a current operation.

If there are numerous high priority packets, the hub may ensure that the lower level packets receive a certain minimum level of service in a number of ways. For example, every high level packet could be followed by a low level packet or, a timer could be associated with each of the input buffers such that if the hub delay exceeds a specified value then a lower priority packet would be transmitted regardless of the existence of higher priority packets which have been stored more recently.

The seventh field in the FIG. 5 packet, if present in the particular data packet being transmitted, provides an indication to the hub of whether the packet has a pre-emptive (P) or nonpre-emptive (N) status. If a packet is afforded a preemptive status, it will cause the hub to discontinue service to the packet it is processing so that the packet with pre-emptive status will be immediately served and the pre-empted packet retransmitted as soon as the pre-empting packet has been transmitted. In a preferred embodiment of the invention however, packets would normally be designated with nonpre-emptive status. Accordingly, even the highest priority packet would not be serviced until the hub had completed its current transmission.

The eighth field in the packet generally identifies to the hub the type of data transmission which is to be effected by the hub with respect to the packet. For example, a particular packet which originates from a node can be retransmitted by a hub universally (U), selectively (S) or globally (G).

Referring to the network depicted in FIG. 3, if a data packet received from the node #5 which is linked to the hub #3 is to be universally transmitted, the eighth field in the packet of FIG. 5 would contain data indicative of this. Accordingly, the hub #3 would transmit the data packet to all nodes in the network via a particular hub which has been arbitrarily designated as a master hub for transmitting all universal transmissions in the network. For example, in FIG. 3 the hub #1 would be the logical choice as the master hub since it is located at the center of the network.

If the eighth field of the data packet indicates that a selective broadcast of the data packet is to be performed, the hub would only transmit the packet to a particular, addressed node. Such a feature enhances network security by avoiding altogether the presentation of a packet to a node or hub which is not intended to receive the packet. Thus, for example, if the node #5 in the hub #3 transmitted a packet destined solely for the node #1 of the hub #1, then the packet would contain the address of the latter node as the destination and would indicate to the hub that a selective broadcast is to be performed. Where a local selective broadcast is to be performed between two nodes which are connected to the same hub, the selective transmission will again be indicated to the hub. In such a case, the transmission can be handled completely by the particular hub involved. Thus, unlike prior art systems in which packets always had to be re-transmitted through a hub designated as a central controller, the present system can operate more efficiently by performing such a transmission locally.

The provision of a buffer memory in each hub reduces concern that a data packet directed to a hub which is currently performing a local selective broadcast will be involved in a collision. Therefore, during such a local transmission, other transmissions within the FIG. 3 network can be performed, such that the network efficiency can be further enhanced. Furthermore, with a selective broadcast in accordance with the present invention, there is a greater degree of overall network fairness in allocating bandwidth, since packets addressed to a local or close-by destination do not have to climb to the top of the network tree competing for service at every hub along the way.

The eighth field in the FIG. 5 packet can, as mentioned above, also indicate to the hub that a local global broadcast is to be performed (i.e., bits corresponding to "G" included in the eighth field). In such a case, a packet received by a hub from a particular node associated with a particular hub will be transmitted to all other nodes which are connected to that same hub. For example, the first node connected to the hub #3 in FIG. 3 can use this packet indicator to inform the hub that the packet is to be transmitted to the second through the fifth node of the hub #3. The source node #1 will also receive a copy of the packet transmitted by the hub to ensure proper transmission.

The ninth field in the data packet of FIG. 5, which is labelled "1 to M" provides an indication of the hub which is currently serving the packet. The letter M corresponds to the number of hubs in the network. During, for example, a universal or non-local selective broadcast in the FIG. 3 network, a packet would be transmitted through more than one hub. Accordingly, as the packet proceeds through the network, this field would keep track of the hub which is currently servicing the packet.

Turning now to FIGS. 7A and 7B, examples of packet information for transmitting data from one location to another in, for example, the FIG. 3 network are shown. The packets depicted in FIGS. 7A and 7B have been abbreviated in the interest of clarity.

In FIG. 7A, representing a fifth buffer the first example corresponds to a universal broadcast from the node #5 of the hub #3 to all of the nodes in the FIG. 3 network. The first packet shown in this example indicates to the source hub #3 that the packet will be transmitted to the hub #1 which has, for purposes of this example, arbitrarily been designated as a master or central hub to perform all universal broadcasts. However, it should be noted that although all universal broadcasts can be performed by a single designated hub, any hub in FIG. 3 could, in an alternative embodiment, perform such a broadcast since all of these hubs are similarly structured.

Returning to the first example in FIG. 7A, the first field from the left in the first packet shown indicates that hub #1 will perform a universal broadcast, as indicated by the third field. The zero in the second field confirms that all nodes directly connected to the central hub are to receive the data packet. The fourth field corresponds to the current hub serving the packet (i.e., field 9 in FIG. 5), and the last two fields correspond to the source hub and node, respectively.

After the packet has been received by the hub #1, the hub #1 transmits the second packet shown in the first example of FIG. 7A to complete the universal broadcast. As can be seen, the zeroes in the first two fields of this second packet indicate that universal transmission to all hubs and nodes, respectively, is desired. The fourth field has been changed to indicate that it is the hub #1 which is now servicing the packet.

Examples 2 and 3 of FIG. 7A correspond to selective broadcasts as discussed previously. The fields in these examples correspond to those discussed with respect to the first example. A bit sequence designated "S" has been included in the third field to indicate that a selective broadcast is to be performed. In order to perform the transmission in example 2, the packet must pass through the hub #2 (see FIG. 3), and thus, the first two packets are required. The third packet in this example corresponds to a confirmation packet which provides an indication to the source node that the transmission was completed.

The fourth and fifth examples in FIG. 7A correspond to local global and local selective broadcasts, respectively. As mentioned previously, bits designated by the letter "G" in the third field of example 4 indicate to the hub that the packet is to be transmitted by the hub to all of the other nodes linked to the hub. The "S" in the third field of the example 5, in combination with a "2" in the second field and an identical source and destination hub (the first and fifth fields) indicates to the hub that a local selective broadcast is to be performed.

The examples shown in FIG. 7B correspond to an embodiment where a Random Access Buffer is used. Although for the most part, the information in the fields 3 to 8 of these examples corresponds to that of FIG. 7A, two additional fields have been included. The two additional fields correspond to information regarding priority level and nonpre-emptive status, respectively, as discussed with respect to FIG. 5.

In operation, the inclusion of a buffer in each of the hubs permits increased flexibility of a star-configured network, using a more sophisticated protocol to ensure system efficiency. Accordingly, the network in a preferred embodiment of the invention uses the following protocol:

(i) An arriving packet at an idle hub is transmitted virtually immediately without any carrier sensing. That is, when a packet arrives at an idle hub, the hub immediately begins to place the packet in the buffer. While the first few fields of the packet (which include the destination of the packet) are being stored, the hub will rapidly determine the destination address of the packet. If the packet is destined for a node associated with another hub, the hub currently serving the packet will, after consulting a route directory, immediately begin to transmit the packet towards that other hub, and will not delay the packet even though a copy is retained until the packet is delivered. Thus, precious network time is not wasted storing the total packet in the buffer of an idle hub which is not the destination hub for the packet. All packets are transmitted only once by a node (no retransmissions are necessary), because no collision can occur, and each packet is guaranteed of successful delivery at its destination after it has been transmitted.

(ii) Each node receives all of the packets addressed to it by the other nodes. That is, packets which are not addressed to a particular node will not even be received by that node.

(iii) Each node also receives a copy of its own packet from the hub as a method of providing a first-order form of acknowledgement that the packet has been received at its destination.

(iv) A copy of the transmitted packet by a node is retained in its buffer and is only deleted after the packet has been received at its destination.

(v) The hub protocol further depends upon the state of the buffer, which is either empty (hub is idle, or free) or nonempty (hub is busy). The protocol is described as follows (assuming only a single hub network).

(a) When only one node forwards a packet to the hub while the hub is idle, the selection and ordering component immediately passes the packet via the link to the broadcast section where it is broadcast to the particular network nodes. Because the hub can identify the packet destination from the first few fields it receives, time is not wasted storing the total packet in the hub's buffer before it is transmitted. "Immediately" or "virtually immediately" herein are meant to include circumstances where the hub examines the first few fields of the packet before beginning transmission even though each packet is stored there is no delay because it is reading out as it reads in.

(b) When two or more nodes contend for transmission simultaneously while the hub is idle, the selection and ordering component selects one of the contenders to begin transmission virtually immediately using a prescribed ordering sequence as discussed previously. Again, because the destination addresses of the packets are received first, the hub can quickly determine which packet has the highest priority and begin transmission of that packet before it is completely stored in the buffer.

(c) When one or more nodes contend for transmission while the hub is busy, the packets from these nodes wait in the hub buffer until the packet which is being transmitted by the hub is completed and only after this will the transmission of the contending packets begin in accordance with the prescribed ordering sequence. In addition, the hub will ensure that no packet placed in the buffer will be subject to an unbounded delay. This can be achieved by, for example, providing that the hub will monitor the time at which a packet is stored in the buffer. Any low priority packet which is precluded from transmission for a preset period of time would be reprioritized within the buffer to ensure its transmission. Other equally effective methods of preventing unbounded delay, within the buffer would be readily recognizable to one of ordinary skill in the art as mentioned previously.

The use of a buffer to store packets as a method of providing a truly collision free network is novel with this invention. The use of such buffers to store data temporarily surprisingly does not entail any undue delays in overall system performance. In order to demonstrate the advantage of using buffers in the hub controllers as disclosed in the present invention, a mathematical analysis with the FIFO Buffer Model is now provided.

Using an analytic model, the throughput and delay characteristics of an embodiment of the inventive protocol for active star-configured FOLAN'S can be ascertained. The analysis of the protocol is based on an embedded discrete-time queuing process obtained by examining the system only at the beginning of the node transmission times. Mathematical expressions for the throughput and the mean packet delay are derived. The throughput is obtained from the transmission cycle analysis, where expressions are derived for the mean lengths of the transmission cycle components. The mean packet delay consists of the mean waiting time of a packet and the packet transmission time. Based on the modified mode of operation, the hub is modeled by an M/D/1 queue with batch arrivals, where the batch size is equal to the number of nodes contending for transmission simultaneously. Results from queuing theory will be used to calculate the mean waiting time of a packet. The effects of the system population, packet size and transmission rate on the throughput and delay characteristics will also be considered.

The following assumptions have been made in the formulation of the analytic model:

($A_1$): The hub controller time is slotted. The duration of a slot, $\Delta$, is equal to the maximum propagation delay (in seconds) between any two nodes in the network and is identical for all nodes in the network. $\Delta$ is taken to be the time unit.

($A_2$): All nodes are statistically identical.

($A_3$): All nodes are synchronized so that the contention for transmission occurs only at the time slot boundaries.

($A_4$): Each node has a buffer space of one unit.

($A_5$): Packets arrive at a node according to the Bernoulli process with parameter $\sigma$ which is the probability of one arrival at the end of a slot.

($A_6$): The system is lightly loaded and $\sigma$ is taken to be very much less than unity, that is, $\sigma < \sigma << 1$.

($A_7$): Packet lengths are constant and equal to T slots, where T is an integral multiple of slot time. The node transmission time is equal to T slots and consists of the packet transmission time plus an additional slot which accounts for the propagation delay due to the buffer, hence $T' = T + 1$ slots.

Based on the above assumptions, a discrete-time queuing model can be constructed for the system by observing the state of the system at the beginning of each slot. However, the analysis of such a model is formidable. Hence, an approximate model shall be formulated by examining the system only at the beginning of each node transmission time (represented by the numbered dots in FIG. 8). In order to do so, the following additional assumption is made on the packet generation by each idle node in a node transmission time.

($A_8$): An idle node generates one packet with probability $v = \sigma T'$ at the end of a node transmission time.

Since $\sigma << 1$ and typically $1/\sigma >> T'$, then the system state changes very slowly in a node transmission time. Consequently, assumption ($A_8$) is approximately valid and the performance of the model based on adopting assumption ($A_8$) does not significantly differ from the performance of the model without making the assumption.

The throughput (controller utilization), $S_H$, is defined as the fraction of time the controller is busy during a transmission cycle (FIG. 8) and the expression for $S_H$ is given by $$S_H = \frac{E[\text{controller busy period}]}{E[\text{length of a transmission cycle}]} \quad (1)$$

where $E[x]$ is the mathematical expectation of $x$.

Figure 8:
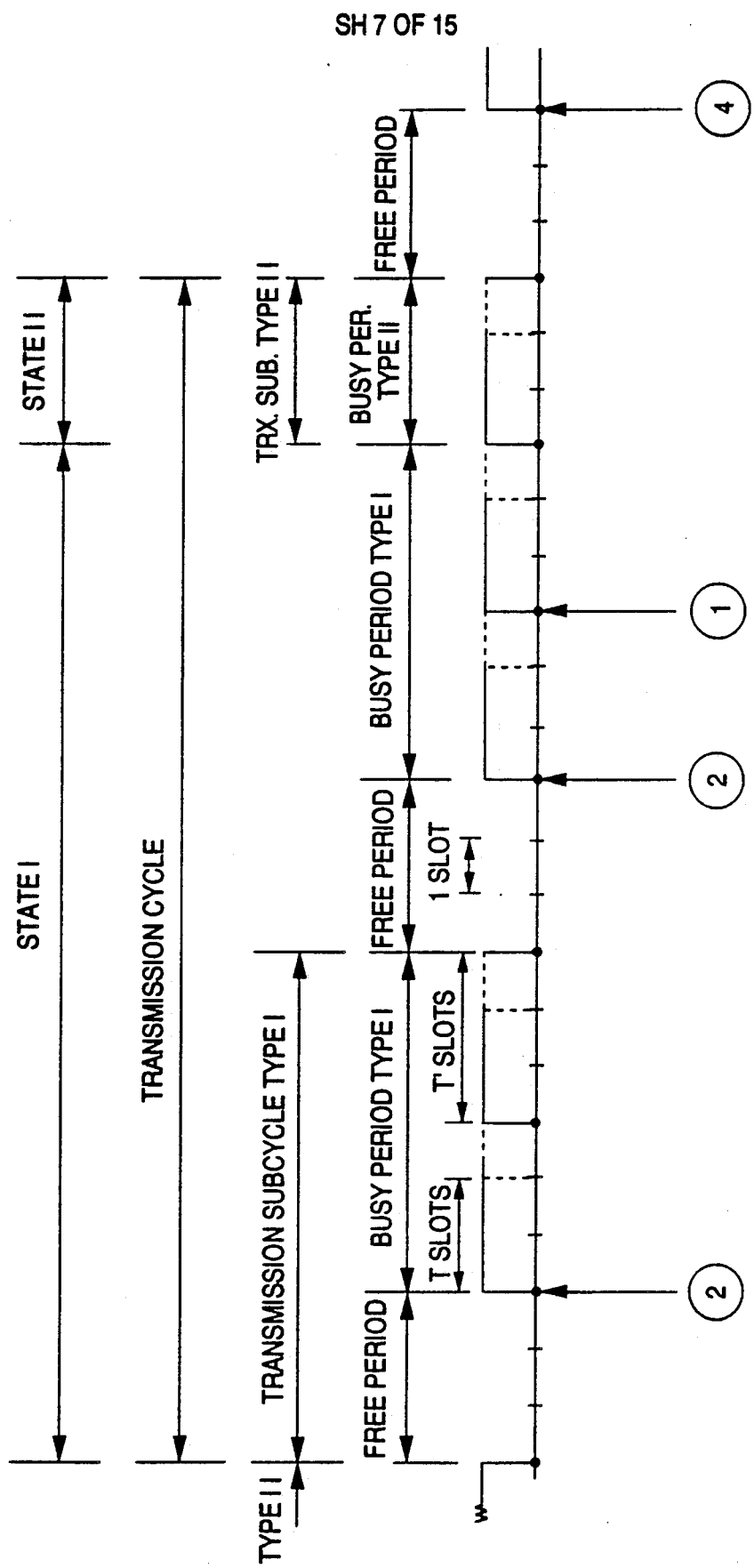
FIG. 8 is a timing diagram of the transmission cycle for the hub.

The mathematical relationship for the throughput is obtained from the transmission cycle length analysis which is presented as follows. FIG. 8 depicts a timing diagram of the transmission cycle for the controller and it consists of two types of transmission subcycles. Transmission subcycle Type I consists of a free period which is followed by a busy period Type I that is generated by all the nodes contending for transmission simultaneously when the controller is free. Transmission subcycle Type II consists of only the busy period Type II which is generated by all the nodes contending for transmission when the controller is busy. Under the assumption that the system is lightly loaded, almost all the transmission subcycles are transmission subcycle Type I which are independent and identically distributed. A transmission cycle therefore consists of a number of contiguous transmission subcycles Type I and one transmission subcycle Type II. The mean lengths of the free period, the busy period Type I and the busy period Type II, which are the transmission cycle components will now be evaluated.

(i) Mean Length of the Free Period: From FIG. 8, the mean length of the free period is geometrically distributed with parameter $\theta$, where $\theta$ is defined as the probability that no node contends for transmission at the beginning of a node transmission time. The probability that the length of a free period, I, consists of i node transmission times is given by $$Pr[I=i] = \theta^{i-1}(1-\theta), \quad i=1,2,3,\ldots \qquad (2)$$

so that the mean length of the free period, $\bar{I}$, (in node transmission times) is expressed by $$\bar{I} = \frac{1}{1-\theta} \qquad (3)$$

where $\theta$ is given by $(1-v)^M$.

(ii) Mean Length of the Busy Period Type I: Let N be the random variable ($N \in \{1,2,3,\ldots,M\}$) denoting the number of nodes contending for transmission simultaneously when the controller is free (batch size of the transmission subcycle Type I). Then the length of an arbitrary busy period Type I, $B_I$, is defined by $$B_I = N T' \qquad (4)$$

so that the mean length of the busy period Type I (in slots) is given by $$\bar{B}_I = \bar{N} T' \qquad (5)$$

where $\bar{N}$, the mean number of nodes contending for transmission simultaneously when the controller is free is obtained as:

$$\bar{N} = \frac{Mv}{1-\theta} \qquad (6)$$

Equation (6) can be obtained as follows. Let N be the random variable defining the number of nodes which have generated a busy period Type I. Clearly, $N > 0$. By applying the conditional expectation concept in probability theory, we can write $$E[N] = E[N|N>0]Pr[N>0] + E[N|N=0]Pr[N=0] \qquad (6.1)$$

where $E[x]$ is the mathematical expectation of $x$. It is easy to see that $E[N|N=0] = 0$. By defining $\bar{N} = E[N|N>0]$ and then solving for $\bar{N}$ in (6.1), we obtain $$\bar{N} = \frac{E[N]}{Pr[N>0]} \qquad (6.2)$$

$Pr[N>0]$ is the probability that at least one node has generated an arrival at the end of a node transmission time and will thus contend for transmission at the beginning of the next transmission epoch. If $\theta$ is defined as the probability that none of the idle nodes generates an arrival, $Pr[N>0]$ is then given by $(1-\theta)$. Substituting the expression for $Pr[N>0]$ into (6.2) and then using the definition of mathematical expectation for discrete random variables, we have $$\bar{N} = \frac{\sum_{n=1}^{M} n Pr[N=n]}{1-0} \qquad (6.3)$$

Since each node independently generates a packet according to the Bernoulli process, the total number of nodes in the active-transmit state is binomially distributed. Equation (6.3) becomes $$\bar{N} = \frac{\sum_{n=1}^{M} n \binom{M}{n} v^n (1-v)^{(M-n)}}{1-0} \qquad (6.4)$$

After simplifying we obtain $$\bar{N} = \frac{Mv}{1-\theta} \qquad (6.5)$$

which proves Equation (6).

(iii) Mean Length of the Busy Period Type II: The length of the busy period Type II depends on the total number of nodes in the active-wait state at the end of a busy period Type I. From the unity buffer size assumption, this is equivalent to the number of idle nodes each of which has generated one packet during the current busy period Type I. At this point it is convenient to define the following random variable. Let X = random variable defining the total number of nodes in the active-wait state at the end of a busy period Type I Furthermore, recall that N = random variable defining the number of nodes which have generated the current busy period Type I, that is, number of nodes in the active-transmit state at the beginning of the current busy period Type I Noting that X depends on N, we can write [9]

$$E[X] = E[E[X|N]] \qquad (7)$$

which can be written in expanded form as:

$$E[X] = \sum_{k=1}^{M} \left( \sum_{j=1}^{M-k} j \frac{Pr[X=j|N=k]}{Pr[X \geq 1|N=k]} \right) \cdot \frac{Pr[N=k]}{Pr[N \geq 1]} \qquad (8)$$

In proving equation (8), an important property of conditional expectation is that for all random variables X and N $$E[X] = E[E[X|N]] \qquad (8.1)$$

Since N is a discrete random variable, then Equation (8.1) states that $$E[X] = \sum_{k=1}^{M} E[X|N=k] Pr[N=k] \qquad (8.2)$$

where $E[X|N=k]$ is the conditional expected number of nodes that are in the active-wait state. X is also a discrete random variable and we can write $E[X|N=k]$ as $$E[X|N=k] = \sum_{j=1}^{M-k} j Pr[X=j|N=k] \qquad (8.3)$$

where $Pr[X=j|N=k]$ is the conditional probability that j nodes are in the active-wait state at the end of a busy period Type I given that k nodes are in the active-transmit state at the beginning of a busy period Type I. Since $k \geq 1$ in (8.2), $Pr[N=k]$ must be normalized by the probability that at least one node is in the active-transmit state at the beginning of a busy period Type I ($= Pr[N \geq 1]$). Similarly, since $j \geq 1$ in (8.3), $Pr[X=j|N=k]$ must be normalized by the probability that at least one node is in the active-wait state at the end of a busy period Type I ($=Pr[X \geq 1|N=k]$). By introducing these normalization probabilities into (8.2) and (8.3), Equation (8.1) becomes $$E[X] = \sum_{k=1}^{M} \left( \sum_{j=1}^{M-k} j \frac{Pr[X = j|N = k]}{Pr[X \geq 1|N = k]} \right) \frac{Pr[N = k]}{Pr[N \geq 1]} \quad (8.4)$$

which proves (8).

From the assumption that a silent node cannot generate a new packet during the current transmission subcycle, we have $E[X]=0$ for $k=M$. Hence equation (8) reduces to $$E[X] = \sum_{k=1}^{M-1} \left( \sum_{j=1}^{M-k} j \frac{Pr[X = j|N = k]}{Pr[X \geq 1|N = k]} \right) \frac{Pr[N = k]}{Pr[N \geq 1]} \quad (9)$$

where $$Pr[N = k] = \binom{M}{k} v^k (1 - v)^{(M-k)} \quad (10a)$$

$$Pr[N \geq 1] = 1 - \theta \quad (10b)$$

and $$Pr[X \geq 1|N = k] = 1 - \alpha^k \quad (10c)$$

$\alpha$ is the probability that none of the idle nodes generate a new packet at the end of a node transmission time and is given by $(1-v)^{(M-k)}$.

The conditional probability $Pr[X=j|N=k]$ in (9) is given by $$Pr[X = j|N = k] = \sum_{i=1}^{\min(j,k)} \binom{k}{i} \beta_j^i \alpha^{(k-i)} \quad (11)$$

wherein $\beta_j^i$ is the probability of having j arrivals in "exactly" i node transmission times. Note that $\beta$ can be interpreted as the probability of having at least one arrival in a specified number of node transmission times. Examples of the possible combinations of the number of arrivals in a given number of node transmission times are provided as follows:

$\beta_j^i$ is defined as the probability of having $j(>1)$ arrivals in exactly $i(\geq 1)$ node transmission times.

For j=1, i=1: {one arrival in exactly one node transmission time}

$$\beta_1^1 = \left[ \binom{M - k}{1} \right] v (1 - v)^{(M-k-1)} \quad (11.1)$$

For j=2, i=1: {two arrivals in exactly one node transmission time}

$$\beta_2^1 = \left[ \binom{M - k}{2} \right] v^2 (1 - v)^{(M-k-2)} \quad (11.2a)$$

For j=2, i=2: {two arrivals in exactly two node transmission times}

$$\beta_2^2 = \left[ \binom{M - k}{1} v (1 - v)^{(M-k-1)} \right]^2 \quad (11.2b)$$

which is interpreted as the probability of generating one packet in each of the two node transmission times.

For j=3, i=1: {three arrivals in exactly one node transmission time}

$$\beta_3^1 = \binom{M - k}{3} v^3 (1 - v)^{(M-k-3)} \quad (11.3a)$$

For j=3, i=2: {three arrivals in exactly two node transmission times}

$$\beta_3^2 = \left\{ \binom{M - k}{2} v^2 (1 - v)^{(M-k-2)} \right\} \left\{ \binom{M - k}{1} v (1 - v)^{(M-k-1)} \right\} \quad (11.3b)$$

Equation (11.3b) is the probability of generating three packets in exactly two node transmission times, that is, two packets are generated in one node transmission time by two idle nodes and one packet is generated in the second node transmission time by one idle node.

For j=3, i=3: {three arrivals in exactly three node transmission times}

$$\beta_3^2 = \left[ \binom{M - k}{1} v (1 - v)^{(M-k-1)} \right]^3 \quad (11.3c)$$

which is the probability of generating three packets in exactly three node transmission times, that is, one packet is generated in each of the three node transmission times. Similar expressions can be written for higher values of j and i.

As can be seen from the above discussion, the mean length of the busy period Type II, $\overline{B}_{II}$, (in slots) is therefore given by $$B_{II} = E[X] \cdot T \quad (12)$$

The expected length of a transmission cycle, $E[T_c]$, (in slots) can then be written as $$E[T_c] = \overline{C}_I(IT + B_I) + B_{II} \quad (13)$$

where $\overline{C}_I$ is the mean number of contiguous transmission subcycles Type I before a transmission subcycle Type II. $\overline{C}_I$ is given by:

$$\overline{C}_I = \frac{1}{p} \quad (14)$$

where p is the probability that at least one node out of the (M−N) idle nodes (in an arbitrary transmission subcycle Type I) are in the active-wait state. p is expressed as $$p = 1 - [(1-v)^{(M-N)}]^N \quad (15)$$

Equation (14) is obtained as follows. Let $C_I$ denote the number of contiguous transmissions subcycles Type I before a transmission subcycle Type II. Clearly, the transmission subcycle Type II cannot occur without the occurrence of at least one transmission subcycle Type I. Hence $C_I$ is a discrete random variable and assumes positive integers, that is, $CI=1,2,3,\ldots$. Now, let p denote the probability that at least one node out of the $(M-\overline{N})$ idle nodes (in an arbitrary transmission subcycle Type I) are in the active-wait state at the end of $\overline{N}$ node transmission times. Clearly, $$p = 1 - q \tag{15.1}$$

where q is the probability that none of the $(M-\overline{N})$ idle nodes is in the active-wait state at the end of $\overline{N}$ node transmission times. q is given by $$q = [(1-v)^{(M-\overline{N})}]^N \tag{15.2}$$

where $(1-v)^{(M-\overline{N})}$ is the probability that none of the $(M-\overline{N})$ idle nodes is in the active-wait state at the end of one node transmission time. From the above, the occurrence of a transmission subcycle Type II after several transmission subcycles Type I can be modeled by a geometric distribution and the distribution for $C_1$ is given by $$Pr[C_1 = i] = q^{i-1}p, \; i=1,2,3,\ldots \tag{15.3}$$

from which the mean number of contiguous transmission subcycles Type I before a transmission subcycle Type II, $\overline{C}_1$, is found to be $$C_I = \frac{1}{p} \tag{15.4}$$

From the above analysis and (1), the throughput can then be expressed as $$S_H = \frac{C_I B_I + B_{II}}{C_I (T = B_I) + B_{II}} \tag{16}$$

Based on the system operation and the constant node transmission time, the controller is modeled by an M/D/1 queue with batch arrivals, where the batch size is equal to the number of nodes contending for transmission simultaneously. The average packet delay, $\overline{D}$, is defined as the average time interval from the instant a packet is generated to the instant it is received at its destination. The average packet delay consists of two components: the mean waiting time, $\overline{D}_W$, and the node transmission time, T'. The mean waiting time in an M/D/1 queue with batch arrivals is given by [10]

$$D_W = \frac{S_H (E[B])^2 T}{2(1-S_H E[B])} \left[ 1 + \frac{\sigma_B^2}{(E[B])^2} \right] + \frac{(E[B]-1)T}{2} + \frac{\sigma_B^2 T}{2E[B]} \tag{17}$$

where E[B] is the mean number of nodes in a batch initiating an arbitrary transmission subcycle and $\sigma_B^2$ is the variance of the number of nodes in a batch initiating an arbitrary transmission subcycle. By assuming that the batch size of nodes contending for transmission simultaneously in the last transmission subcycle Type I (of an arbitrary transmission cycle) is unity, the expressions for E[B] and $\sigma_B^2$ are derived respectively as $$E[B] = N \cdot \frac{C_I}{C_I + E[X']} + (1) \cdot \frac{E[X']}{C_I + E[X']} \tag{18}$$

and $$\sigma_B^2 = (N - E[B])^2 \cdot \frac{C_I}{C_I + E[X']} + (1 - E[B])^2 \cdot \frac{E[X']}{C_I + E[X']} \tag{19}$$

where X' is the total number of nodes in the active-wait state at the end of a busy period Type I under the assumption that the batch size of nodes contending for transmission simultaneously in the last transmission subcycle Type I is unity.

To derive the expressions for E[B] and $\sigma_B^2$, successive transmission cycles in FIG. 8 can be considered as an alternating renewal process which describes the controller as being in either of two states: State I (represented by the block of contiguous number of transmission subcycles Type I) and State II (represented by the transmission subcycle Type II). Then, from renewal theory, the long run proportion of time that the controller is in State I is given by $$Pr[\text{State I}] = \frac{E[T_I]}{E[T_I] + E[T_{II}]} \tag{19.1}$$

where $E[T_I]$ is the mean time that the controller is in State I and $E[T_{II}]$ is the mean time that the controller is in State II. Similarly, the long run proportion of time that the controller is in State II is expressed by $$Pr[\text{State II}] = \frac{E[T_{II}]}{E[T_I] + E[T_{II}]} \tag{19.2}$$

$E[T_1]$ is related to $E[\psi_I]$, the mean number of batches initiating the busy period Type I. Similarly, $E[T_{II}]$ is related to $E[\psi_{II}]$, the mean number of batches initiating the busy period Type II. (19.1) and (19.2) can then be rewritten as $$Pr[\text{State I}] = \frac{E[\psi_I]}{E[\psi_I] + E[\psi_{II}]} \tag{19.3}$$

and $$Pr[\text{State II}] = \frac{E[\psi_{II}]}{E[\psi_I] + E[\psi_{II}]} \tag{19.4}$$

Clearly, $E[\psi_I] = \overline{C}_I$, the mean number of transmission subcycles Type I before a transmission subcycle Type II. However, $E[\psi_{II}]$ is not easily determined. For $\sigma << 1$, it is reasonable to assume that the batch size of nodes contending for transmission simultaneously in the last transmission subcycle Type I (in an arbitrary transmission cycle) is unite, then under this assumption the mean batch size is unity and $E[\psi_{II}] = E[X']$, the mean number of packets which are in the active-wait state at the end of the last transmission subcycle Type I of an arbitrary transmission cycle.

The mean batch size initiating an arbitrary busy period can then be written as $$E[B] = N \cdot \frac{C_I}{C_I + E[X']} + (1) \cdot \frac{E[X']}{C_I + E[X']} \quad (19.5)$$

which proves (18).

From the definition of variance, $\sigma_B^2$ is expressed by $$\sigma_B^2 = (N - E[B])^2 \cdot \frac{C_I}{C_I + E[X']} + (1 - E[B])^2 \cdot \frac{E[X']}{C_I + E[X']} \quad (19.6)$$

which proves (19).

$C_I$ is given by (14) and the expression for $E[X']$ is obtained from (9) with X replaced by X' and the conditional probability $Pr[X'=j|N=k]$ redefined to take into consideration the unity batch size assumption. Then we have $$Pr[X' = j | N = k] = \binom{k}{j} \left[ \binom{M-k}{1} v (1-v)^{(M-k-1)} \right]^j \alpha^{(k-j)} \quad (20)$$

for $j=1,2,3,\ldots$

The mean packet delay, $\overline{D}$, (in slots) of an arbitrary packet is then given by $$\overline{D} = \overline{D}_w + T \quad (21)$$

Instead of calculating the throughput $\{S_H\}$, the mean branch size (E [B]) and the variance of the batch size ($\sigma_B^2$) using the above results which are obtained on the basis of the stated heuristic, we observe that these parameters could also be obtained from a strict modeling of the hub by an M/D/1 queue with batch arrivals where the batch size has a binomial distribution with parameters m (the number of nodes in the network) and v (the packet generation made by a node). From the busy node idle period analysis of an M/D/1 queue with batch arrivals, it can be shown that the hub utilization (throughout) is given by $$S_H = V_B E[B] \quad (22)$$

which must be less than unity for stability $v_E$ is the mean batch arrival rate (in batches per node transmission time) and for a binomially distributed batch size E [B] and $\sigma_B^2$ are given respectively by $$E[B] = Mv \quad (23)$$

and $$\sigma_B^2 = Mv(1-v) \quad (24)$$

The numerical and simulation results presented below are based on a system with the following chosen parameters: maximum node-controller-node distance is 4 km and this gives a maximum propagation delay of 20 μsec (1 slot). Two packet sizes are considered, a packet size, L, of 250 bytes and L=2500 bytes. Note that the 250 byte-packet and the 2500 byte-packet correspond to 2 and 20 slots respectively for a transmission rate, B, of 50 Mbits/sec on each optical fiber link. Similarly, the chosen packet lengths correspond to 1 and 10 slots for a transmission rate of 100 Mbits/sec. Two system populations—a 4-node system and a 10-node system are considered and for each system the system throughput and the mean packet delay are determined using the analytic expressions derived in the previous section. In addition, the accuracy of the analytic results is assessed by discrete-event simulations.

Figure 9:
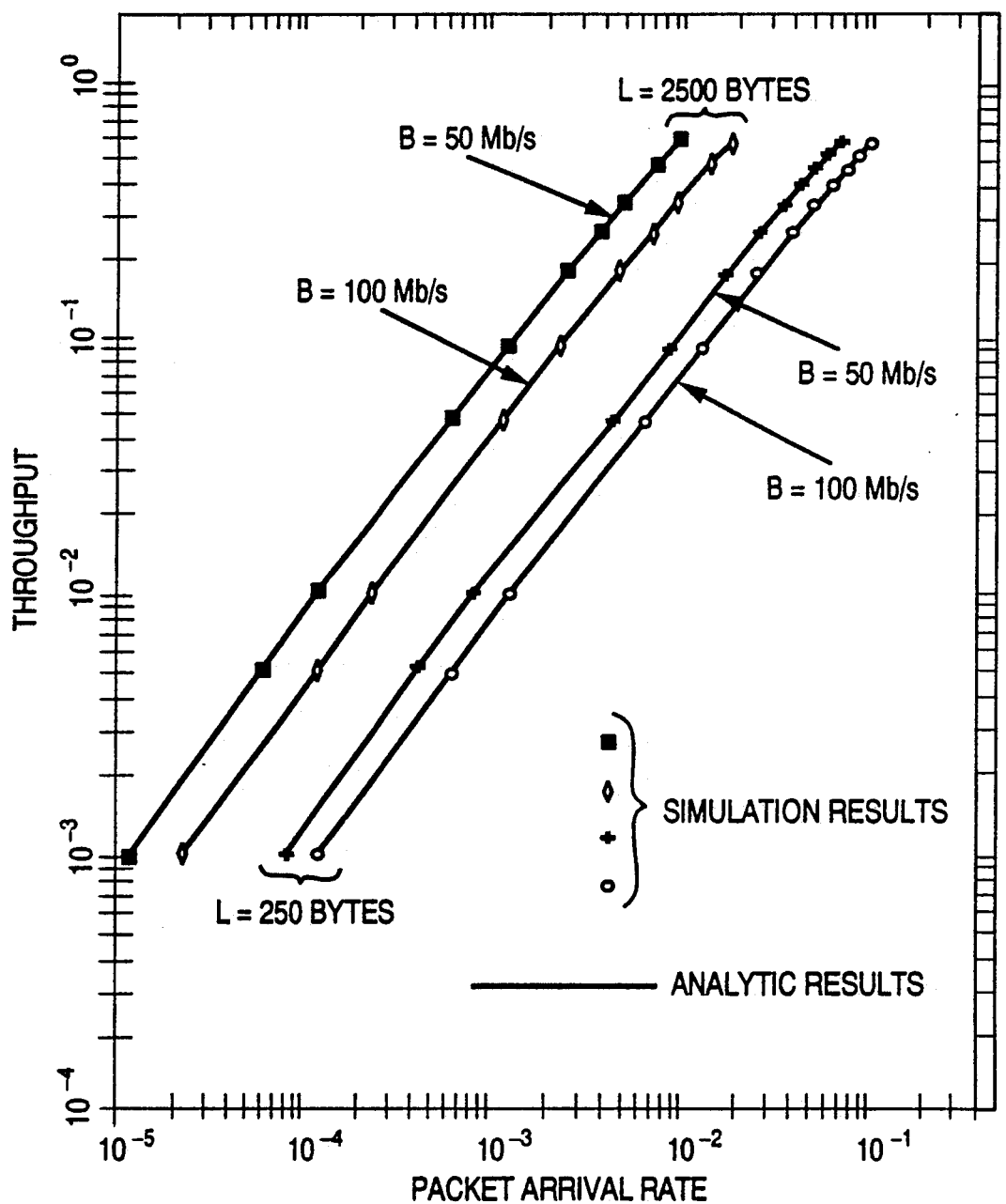
FIGS. 9 and 10 show theoretical throughput versus light (i.e., packet arrival rate) characteristics for a 4-node system and for a 10-node system, respectively.
Figure 10:
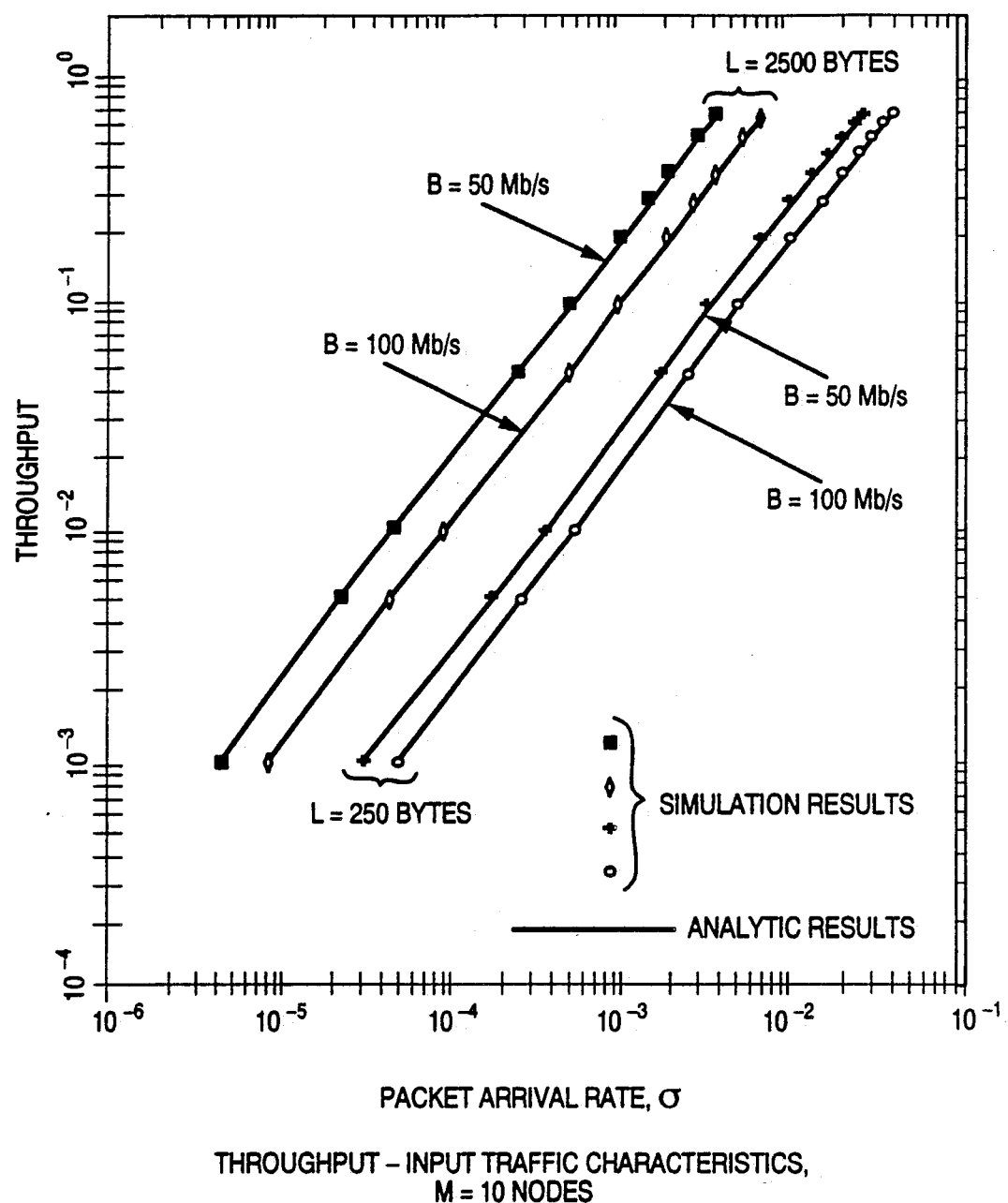
Figure 11:
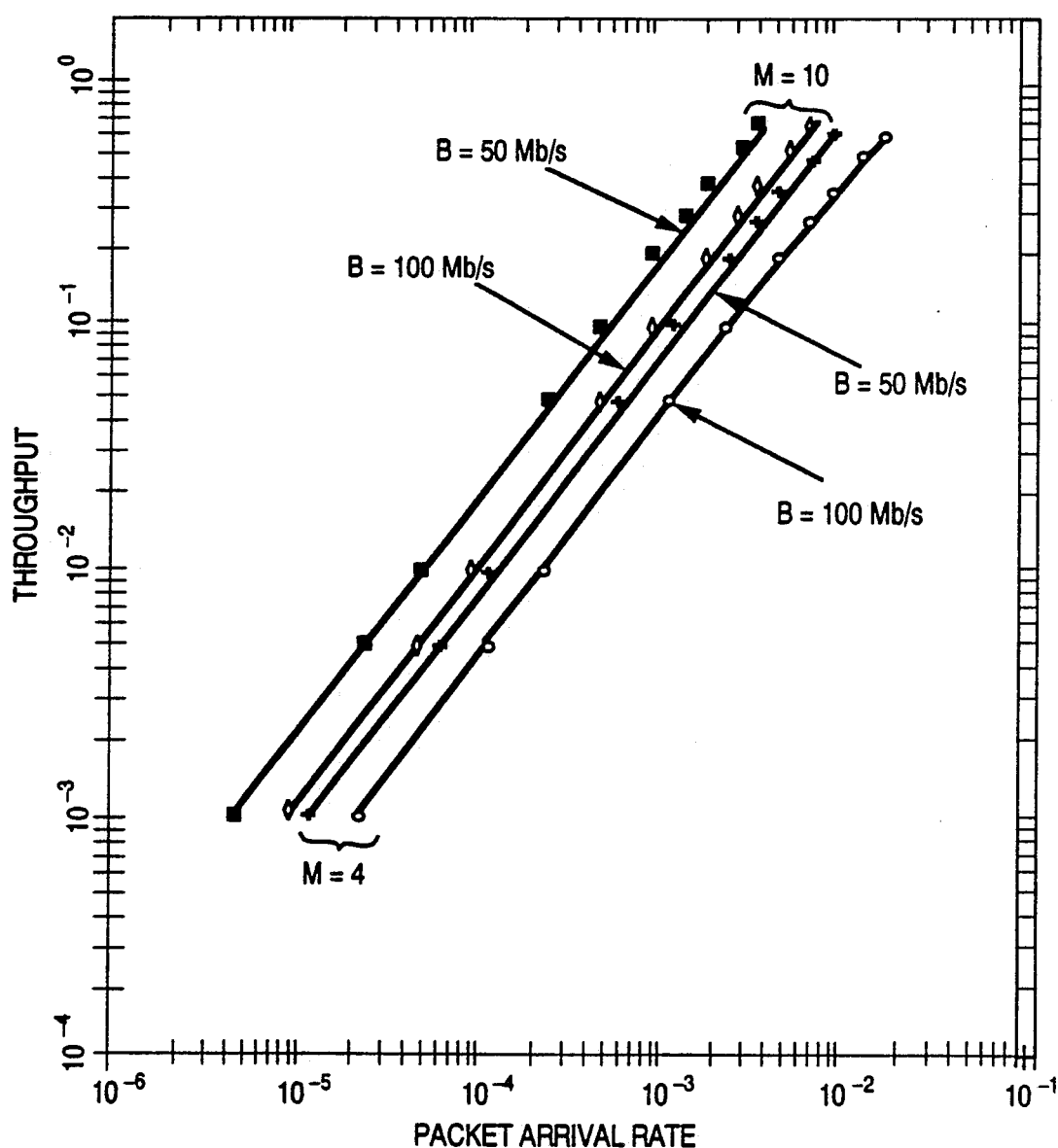
FIG. 11 shows a comparison of theoretical throughput versus input traffic characteristics for the 4-node system and the 10-node system.

FIG. 9 and FIG. 10 depict the throughput-input traffic characteristics for the 4-node system and the 10-node system respectively. In the range of packet arrival rates considered, there is a linear relationship between the throughput and the packet arrival rate. Note the excellent agreement between the analytic and simulation results at low values of packet arrival rate and the slight deviation at high values of packet arrival rate. The agreement obtained validates the heuristic that was employed in the throughput analysis. Three points are noteworthy from FIG. 9 and FIG. 10. First, for a fixed transmission rate, an increase in packet length (in bytes or in slots) implies an increase in system throughput. Second, if the packet length is fixed, an increase in transmission rate does not necessarily imply an increase in system throughput. To achieve a high system throughput at a high transmission rate, the packet size must be increased accordingly. The third and final point is concerned with the relationship between the increase in packet length system throughput. From the specifications marked on the curves in FIG. 9 and FIG. 10, the packet length are found to be 1, 2, 10 and 20. Thus, it is seen that the system throughput improves as the packet length (in slots) increases. In FIG. 11, the throughput-input traffic characteristics for the two system sizes considered are compared and it is observed that the 10-node system exhibits higher throughput than the 4-node system for the range of packet arrival rates considered.

Figure 12:
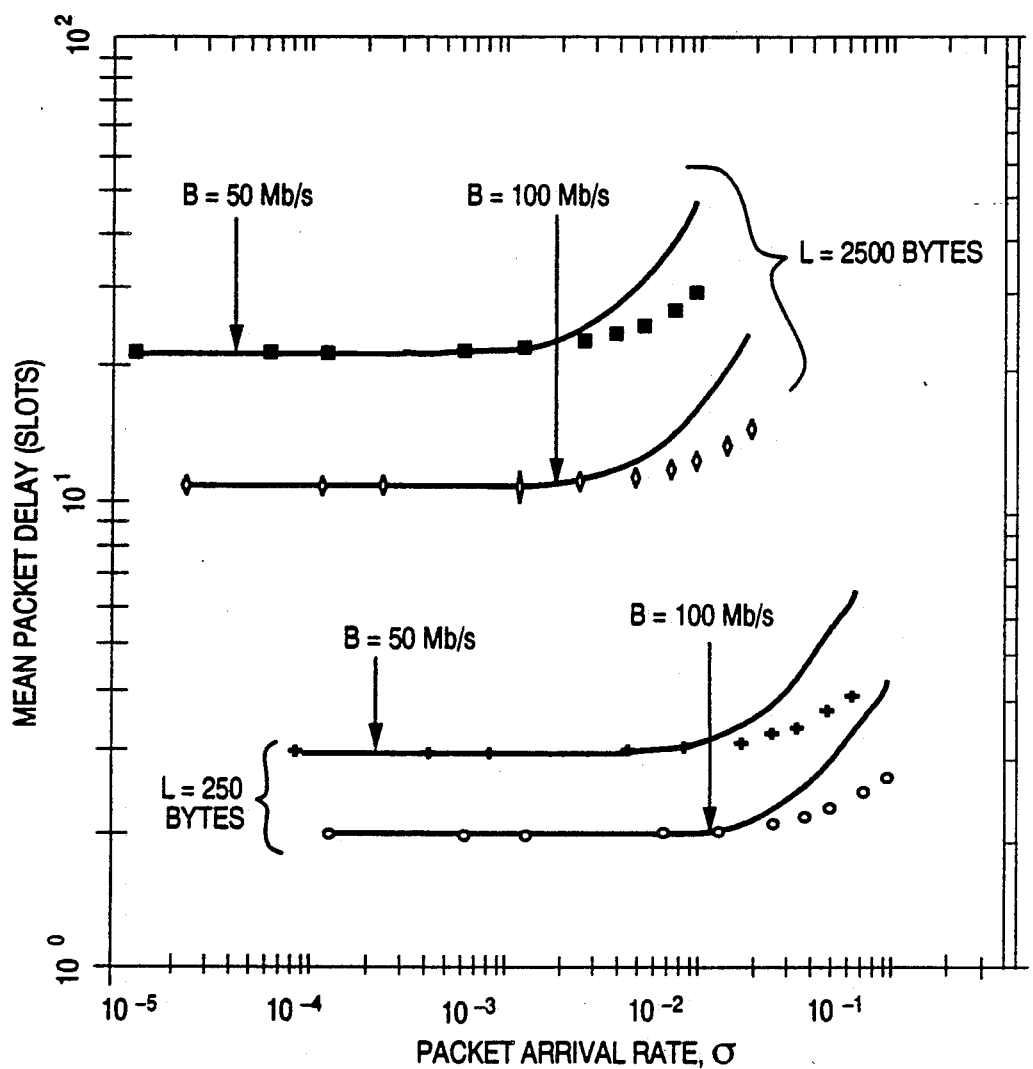
FIGS. 12 and 13 show the theoretical mean packet delay (in slots) versus input traffic per node (packet arrival rate) for the 4-node system and the 10-node system, respectively.
Figure 13:
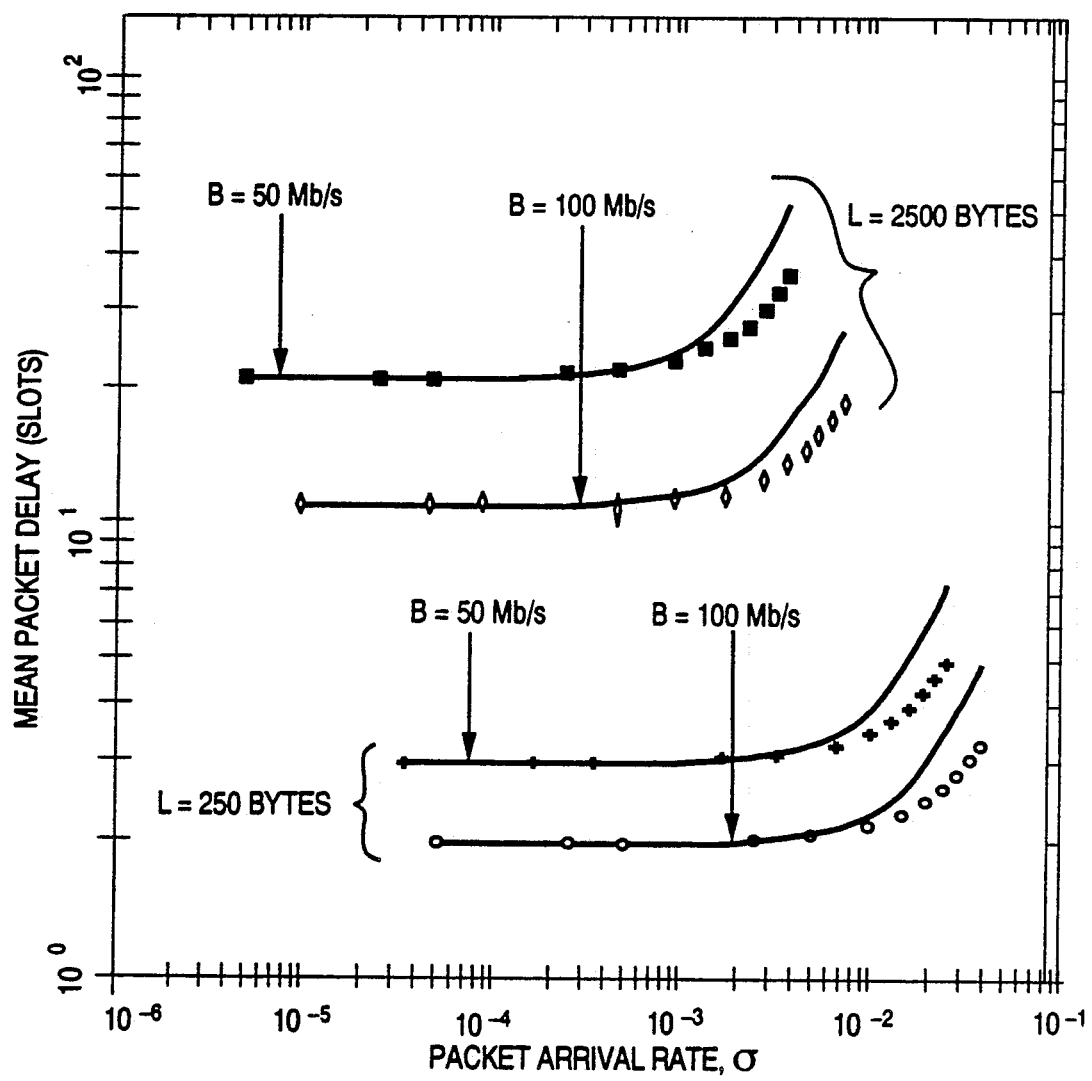
Figure 14:
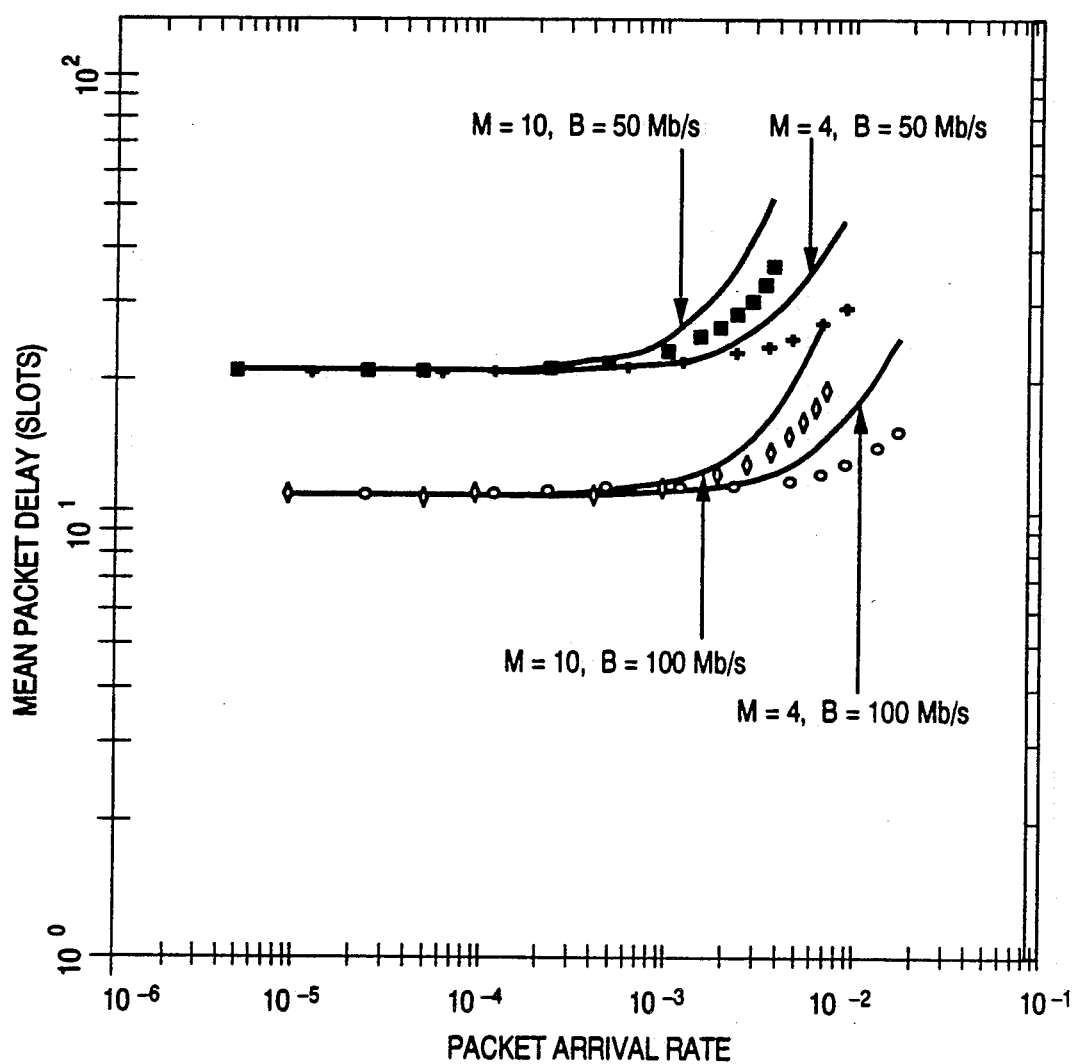
FIG. 14 shows a comparison of the theoretical mean packet delay versus input traffic per node for the 4-node system and the 10-node system.

The mean packet delay (in slots) versus input traffic per node (packet arrival rate) are shown in FIG. 12 and FIG. 13 for the 4-node system and the 10-node system respectively. It is observed from these figures that the mean packet delay is constant (equal to the node transmission time) at low values of the packet arrival rate but increases at high packet arrival rate values. Note the very good agreement between the analytic and simulation results in the low traffic region but the agreement differs with increasing input traffic. The following additional observations are evident from FIG. 12 and FIG. 13. For a fixed transmission rate and at a given packet arrival rate, an increase in packet size corresponds to an increase in the mean packet delay because of the increase in the transmission time of a packet. From the discussion given above on FIG. 9 and FIG. 10 under identical condition of fixed transmission rate, the system throughput increases with an increase in packet size. Thus, a trade-off exists between the throughput and the mean packet delay. The question is how large the packet size can be (given that the transmission rate is fixed) so as to have high system throughput and simultaneously prevent intolerable mean packet delay. It is further observed from FIG. 12 and FIG. 13 that if the packet size is fixed, an increase in the transmission rate implies smaller mean packet delay because packet transmission time decreases with higher transmission rate. This result is desirable but an undesirable effect (throughput degradation) has already been noted above from FIG. 9 and FIG. 10 under the same condition of fixed packet size and increasing transmission rate. We again see the existence of a trade-off between the throughput and mean packet delay. In this case, we are concerned with how high the transmission rate can be so as to reduce the mean packet delay and at the same time prevent system throughput degradation. From the specifications on the curves in FIG. 12 and FIG. 13, it is further observed that the mean packet delay increases with increasing packet length in slots. In FIG. 14, it is seen that for a constant transmission rate, the mean packet delay is the same for the 4-node and 10-node systems at low values of packet arrival rate. However, at high packet arrival rates, the packets transmitted on the 10-node system experience larger average delay than those transmitted on the 4-node system and this implies increasing packet queuing delay.

It is appropriate at this point to explain why there is less agreement between the analytic and simulation results in the high packet arrival rate region of FIG. 12 to FIG. 14. Recall that in the formulation of the analytic model, it was assumed that the system is lightly loaded (Assumption $A_6$). A consequence of this assumption is that most of the transmission subcycles in a transmission cycle are subcycle Type I which are independent and identically distributed. The occurrence of a transmission subcycle Type II after several transmission subcycles Type I is then modeled by a geometric distribution. When the system is heavily loaded, most of the transmission subcycles in a transmission cycle are subcycle Type II. The main problem in this scenario is that the contiguous subcycles Type II are not independent. The dependence arises from the fact that the number of nodes contending for transmission at the beginning of a transmission subcycle Type II is a function of the number of nodes which initiated transmission at the beginning of the preceding transmission subcycle Type II. Hence, the occurrence of a transmission subcycle Type I after several transmission subcycles Type II cannot be modeled by a geometric distribution. In FIG. 9 to FIG. 14, we intentionally extend the plots to the heavy traffic region so as to investigate how this region can be approximated by the independence assumption. The results reveal the validity of the analytic approach which is exemplified by the very good agreement between the analytic and simulation results especially at low values of packet arrival rate. However, in the region of high packet arrival rates, the analytic results are more pessimistic.

Figure 15:
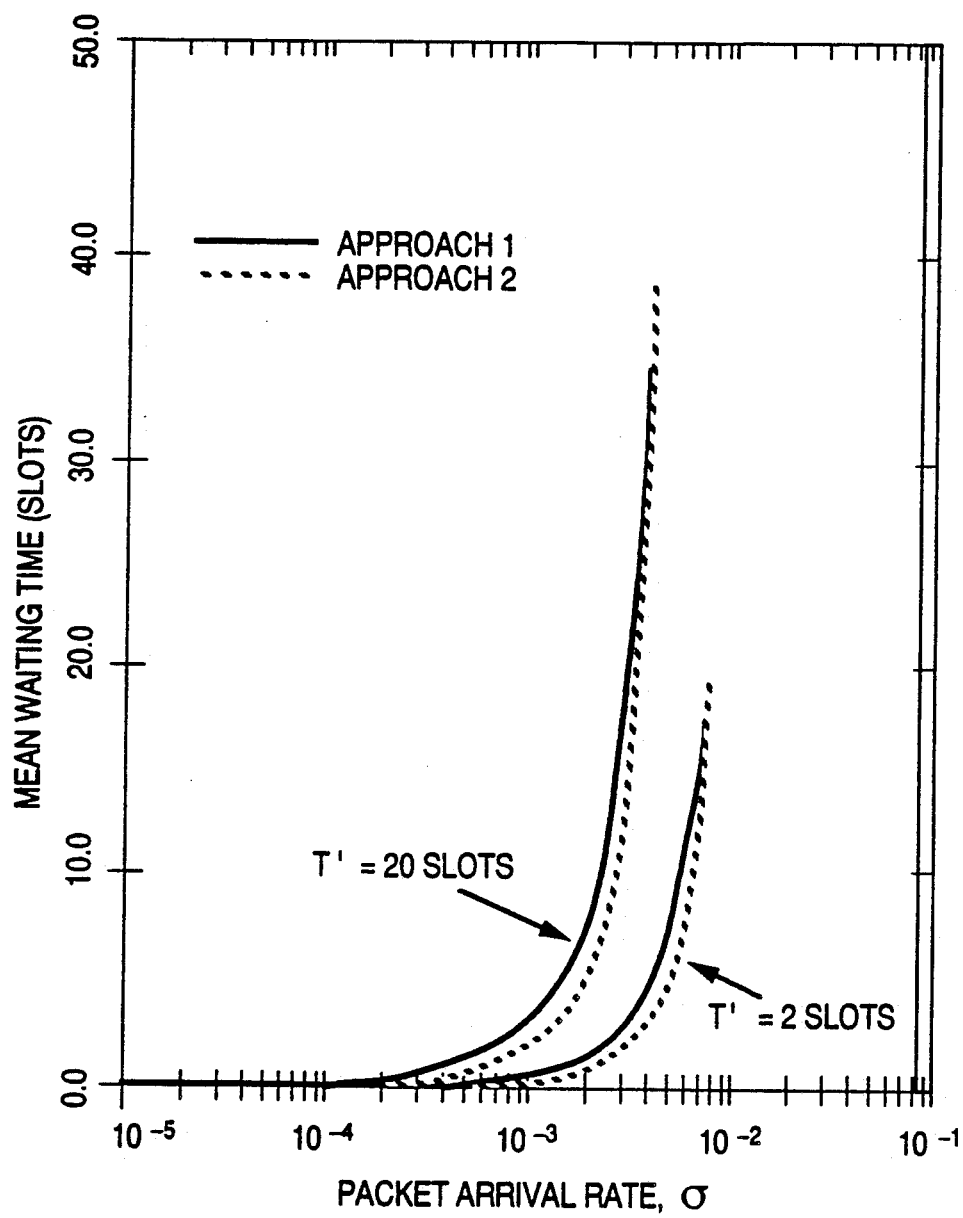
FIG. 15 shows a comparison between different calculations of the mean packet waiting time; and, FIG. 16 shows theoretical throughput-delay characteristics of the local area network of the present invention in comparison with various prior art networks.

FIG. 15 shows a comparison between the mean packet waiting time calculated using equations (16), (18) and (19) in equation (17) and that computed using equations (22) to (24) in equation (17). It is shown that the difference between the simulation and analytic results in FIG. 12 to FIG. 14 are not attributed to the heuristic employed in the derivation of equations (16), (18) and (19).

Figure 16:
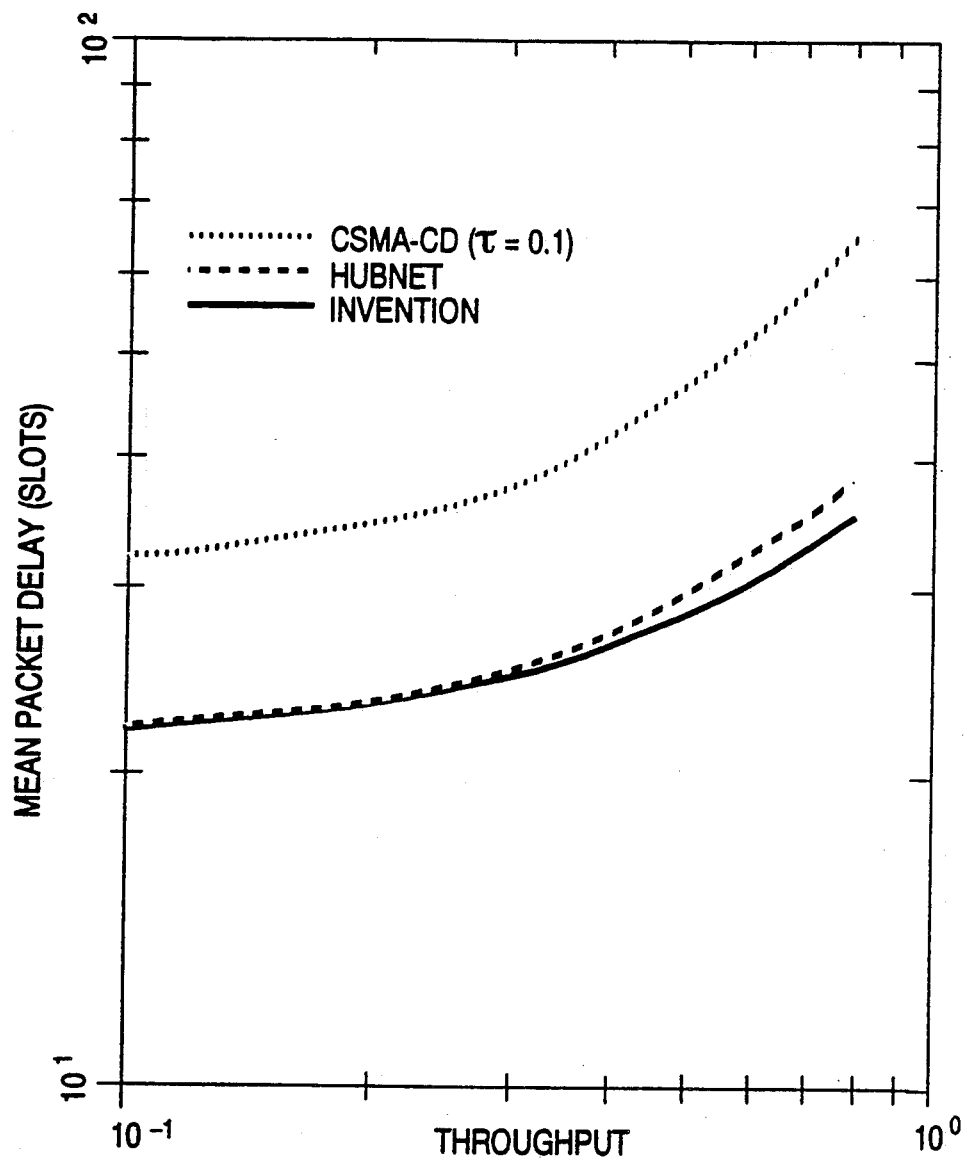

In FIG. 16 we compare throughput-delay characteristics of an embodiment of inventive protocol with those of the known HUBNET and the CSMA-CD which are the previously proposed protocols for active star-configured FOLAN's. The nonpersistent variant of the CSMA-CD protocol which incorporates the delayed first transmission procedure is considered. In the delayed first transmission procedure, a new packet and a backlogged packet (a packet which has sensed the controller busy or a packet that has been involved in collision(s) with other packet(s)) will sense the controller with the same sensing probability, $\tau$. The choice of the delayed first transmission procedure implies that a new packet incurs a geometrically distributed delay with a mean of $1/\tau$ slots and also the retransmission delay of a backlogged packet is geometrically distributed with the same mean of slots. FIG. 16 shows the improvement in throughput-delay performance of the collision-avoidance protocols (HUBNET and STAR-MAP) over the collision-prone protocol (CSMA—CD). In particular, for the chosen set of input parameters, the embodiment of the inventive protocol displays an improved performance over the HUBNET protocol especially at high values of throughput.

Thus, a throughput-delay analysis of active star-configured fiber-optic local area networks incorporating an embodiment of the inventive protocol has been presented. The analysis was based on an embedded discrete-time queuing process and the expressions derived for the system throughput and the mean packet delay. Numerical results were obtained using the derived analytic results and the validity of the analytic results has been confirmed by computer simulations. The numerical examples considered reveal the trade-off between the system throughput and the mean packet delay. The numerical examples also provide valuable insights on the performance of active star-configured fiber-optic local area networks.

The novelty of the disclosed embodiments of the inventive protocol arises from particular features which are not present in the other protocols so far developed for active star-configured FOLAN's. As discussed above, the features include, but are not limited to, the following:

(i) There are no packet retransmissions as all packets are transmitted only once. This feature leads to a significant improvement in network performance especially under heavy traffic.

(ii) Given that the hub traffic intensity is less than unity, the packet access delay (time interval from the instant a packet is generated to when the packet is broadcast by the central hub) is bounded and the upper bound is dependent upon the total number of nodes and hubs connected to that hub.

(iii) A reasonable degree of fairness is exercised—though in the case of simultaneous multiarrivals at the hub, it is possible that one node may always have its packet transmitted before the packets of other contending nodes and this may be thought to imply unfairness. However, there is still a reasonable degree of fairness because each contender is guaranteed a time frame within which its packet will be transmitted. This is not so with the existing collision-avoidance protocol which arbitrarily selects one of the contenders and ignores the rest.

(iv) A network having selective, local global and local selective broadcast capabilities can be employed.

(v) A priority packet service scheme can be utilized to ensure efficient handling of data within the network.

(vi) The intelligence at the hub can be put to a greater use to improve network performance. For example, if the receive section of a node is faulty and cannot receive a packet, the hub can transmit a fault-alert packet to the other nodes, hence none of the other nodes will send packets to the faulty node.

It will be appreciated by those of ordinary skill in the art that the present invention can be embodied in other specific forms without departing from the spirit or essential characteristics thereof. For example, although the invention has been discussed above as it might advantageously be embodied in a fiber optic network, it will be apparent to one of ordinary skill in the art that it could also be embodied in an electrical system. The presently disclosed embodiments are therefore to be considered in all respects illustrative and not restrictive. The scope of the invention is indicated by the appended claims rather than the foregoing description, and all changes that come within the meaning and range or equivalents thereof are intended to be embraced therein.

What is claimed is:

1. A data transmission network comprising: a first node including means for sending a first node packet of data to a first destination;
   a second node including means for sending a second node packet of data to a second destination; and
   controller means, connected to said first node and said second node, for immediately relaying one of said first node packet and second node packet toward its respective destination when the other of said first node packet and said second node packet is not received substantially simultaneously, and for immediately relaying one of said first node packet and said second node packet and temporarily storing the other of said first node packet and said second node packet in said controller means when said first node packet and second node packet are received substantially simultaneously.

2. A data transmission network as claimed in claim 1 wherein said controller means includes buffer means for temporarily storing data packets.

3. A data transmission network as claimed in claim 2 wherein said controller means operates:
   (a) in a first state, when said buffer means does not contain any previously-stored packets and when only one of said first node packet and second node packet is received by said controller means, in which said controller means immediately relays said packet toward its respective destination;
   (b) in a second state, when said buffer means does not contain any previously-stored packets and when said first node packet is received by said controller means at substantially the same time as said second node packet, in which said controller means immediately relays one of said first node packet and second node packet towards its respective destination and continues to temporarily store the other of said first node packet and second node packet in said buffer means to be relayed at a time after said one packet has been relayed; and
   (c) in a third state, when said buffer means does not contain at least one previously-stored packet and when said first node packet is received by said controller means at substantially the same time as said second node packet, in which said controller means temporarily stores at least one of said packets in said buffer means along with said at least one previously stored packet and relays said packets stored in said buffer in a predetermined order at a time after said controller means has determined the order in which all packets in the buffer are to be retrieved from said buffer for relay to their respective destinations.

4. A data transmission network as claimed in claim 1, wherein said controller means includes means for selecting said one of said first node packet and said second node packet in accordance with a predetermined prioritization scheme.

5. A data transmission network as claimed in claim 1, wherein said controller means includes means for ensuring that any packet stored will be relayed within a predetermined amount of time.

6. A data transmission network as claimed in claim 3, wherein said controller means includes means for ensuring that any packet stored will be relayed within a predetermined amount of time.

7. A data transmission network as claimed in claim 1, wherein said first node packet and said second node packet each contain packet identification data, and wherein said controller means includes means responsive to said packet identification data for selecting which of said first node packet and said second node packet to relay and which to temporarily store in said controller means.

8. A data transmission network as claimed in claim 1 further comprising a third node including means for sending a third node packet, and wherein said controller means is additionally connected to said third node and is additionally for immediately relaying one of said first node packet, second node packet, and said third node packet toward its respective destination and temporarily storing the others of said first node packet in said controller means, second node packet, and third node packet in a predetermined order when said first node packet, second node packet, and third node packet are received substantially simultaneously.

9. A data transmission network as claimed in claim 8, wherein said first node packet, second node packet, and third node packet each contain packet identification data, and wherein said controller means includes means responsive to said packet identification data for selecting which of said first node packet, second node packet, and third node packet to relay, which to store in said controller means, and an order in which to store.

10. A data transmission network comprising: a plurality of nodes each including means for sending a packet of data to a destination; and
    controller means, connected to each of said plurality of nodes, for immediately relaying a packet from one of said plurality of nodes toward its respective destination in the absence of a packet being present at substantially the same time from any other node of said plurality of nodes, and for immediately relaying one packet and temporarily storing in said controller means all other packets if packets from more than one of said plurality of nodes are present substantially simultaneously.

11. A data transmission network as claimed in claim 10, wherein said controller means includes buffer means for temporarily storing data packets.

12. A data transmission network as claimed in claim 11, wherein said controller means is more specifically for operating:
    (a) in a first state when said buffer means does not contain any previously-stored packets and when only one packet is received by said controller means, in which said controller means immediately relays said packet toward its respective destination;
    (b) in a second state, when said buffer means does not contain any previously-stored packets and packets are received by said controller means at substantially the same time from more than one node, in which said controller means immediately relays one of the packets towards its respective destination and temporarily stores the other packets in said buffer means to be retrieved and relayed at a time after said one packet has been relayed; and
    (c) in a third state, when said buffer means does not contain at least one previously-stored packet and when packets are received by said controller means at substantially the same time from more than one node, in which said controller means temporarily stores at least one of said packets in said buffer means to be relayed in a predetermined order at a time after said controller means has determined the order to which all packets in the buffer are to be retrieved from said buffer and relayed to their respective destinations.

13. A data transmission network as claimed in claim 10, wherein each of said packets contains packet identification data, and wherein said controller means is responsive to said packet identification data for selecting which of said packets to relay, which to store in said controller means, and an order for storing.

14. A data transmission network as claimed in claim 13, wherein said controller means immediately preempts any current operation upon receipt of a packet containing packet identification data of a predetermined type in order to relay said packet immediately to its respective destination.

15. A data transmission network as claimed in claim 10, further comprising a plurality of said controller means, each connected to a respective plurality of nodes, wherein said data packet includes packet destination data, and wherein said plurality of controller means is for cooperatively routing each of said data packets from a respective originating node to at least one destination node as designated by said packet destination data.

16. A data transmission network as claimed in claim 15, wherein one of said plurality of said controller means includes means for selectively routing a data packet received from a first node connected to said one controller means to at least one other node connected to said one controller means.

17. A data transmission network as claimed in claim 15, wherein said controlling means includes means for routing said data packets to less than all system nodes.

18. A method of regulating a data transmission network comprising a plurality of nodes adapted to exchange packets of data through paths including at least one controller, comprising the steps to be performed by said controller of:
(a) if only one packet arrives at a given time, immediately relaying said one packet towards a destination; and
(b) if at least two packets arrive substantially simultaneously, immediately relaying one packet of said at least two packets towards its destination and temporarily storing each other packet.

19. A method of regulating a data transmission network as claimed in claim 18, further comprising the step of:
choosing said one of said first node packet and said second node packet in accordance with a predetermined prioritization scheme.

20. A method of regulating a data transmission network as claimed in claim 18, further comprising the step of:
ensuring that any packet stored will be relayed within a predetermined amount of time.

21. A method of regulating a data transmission network comprising a plurality of controllers, each connected to a plurality of nodes adapted to exchange packets of data through paths including at least one of said plurality of controllers, comprising the step to be performed by said at least one controller of selectively routing said data packets, from a respective originating node associated with a first of said plurality of controllers to at least one destination node associated with a second of said plurality of controllers such that less than all of said plurality of nodes receive said packet.

22. A method of regulating a data transmission network comprising a plurality of nodes adapted to exchange packets of data through paths including at least one controller having a buffer, comprising the steps to be performed by the at least one controller of:
(a) if only one packet arrives at a given time and said buffer does not contain any previously-stored packets, immediately relaying said one packet towards a destination;
(b) if at least two packets arrive substantially simultaneously and said buffer does not contain any previously-stored packets, immediately relaying one packet of said at least two packets toward a destination and temporarily storing the other packet in said buffer; and
(c) if at least two packets arrive substantially simultaneously and said buffer does contain at least one previously-stored packet, temporarily storing at least one of said at least two packets to be retrieved along with said at least one previously-stored packet and relaying said packets stored in said buffer in a predetermined order after said at least one controller has determined the order in which all packets in the buffer are to be retrieved from said buffer for relay to respective destinations.

* * * * *